US012230008B2

(12) United States Patent
Park et al.

(10) Patent No.: US 12,230,008 B2
(45) Date of Patent: Feb. 18, 2025

(54) IMAGE PROCESSING APPARATUS AND OPERATING METHOD THEREOF

(71) Applicant: SAMSUNG ELECTRONICS CO., LTD., Suwon-si (KR)

(72) Inventors: Jaeyeon Park, Suwon-si (KR); Iijun Ahn, Suwon-si (KR); Soomin Kang, Suwon-si (KR); Hanul Shin, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 332 days.

(21) Appl. No.: 17/894,685

(22) Filed: Aug. 24, 2022

(65) Prior Publication Data

US 2023/0169752 A1 Jun. 1, 2023

Related U.S. Application Data

(63) Continuation of application No. PCT/KR2022/010264, filed on Jul. 14, 2022.

(30) Foreign Application Priority Data

Nov. 19, 2021 (KR) .................. 10-2021-0160711

(51) Int. Cl.
*G06K 9/00* (2022.01)
*G06T 3/40* (2006.01)
(Continued)

(52) U.S. Cl.
CPC .............. *G06V 10/761* (2022.01); *G06T 3/40* (2013.01); *G06V 10/82* (2022.01)

(58) Field of Classification Search
None
See application file for complete search history.

(56) References Cited

U.S. PATENT DOCUMENTS 8,953,896 B2 2/2015 Lee et al.
9,330,442 B2 5/2016 Kang
(Continued)

FOREIGN PATENT DOCUMENTS

CN 109948699 A 6/2019
KR 101797673 B1 12/2017
(Continued)

OTHER PUBLICATIONS

Howard, et al., "MobileNets: Efficient Convolutional Neural Networks for Mobile Vision Applications", 2017, Google Inc., arXiv:1704.04861v1 [cs.CV], 9 pages total.
(Continued)

*Primary Examiner* — Sj Park
(74) *Attorney, Agent, or Firm* — Sughrue Mion, PLLC

(57) ABSTRACT

An image processing apparatus, including a processor configured to execute instructions stored in a memory to: obtain characteristic information of a first image, divide the characteristic information into a plurality of groups, input each group into a respective layer of a plurality of layers included in a convolutional neural network and perform a convolution operation using one or more kernels to obtain a plurality of pieces of output information, generate an attention map including weight information corresponding to each pixel included in the first image, based on the plurality of pieces of output information, generate a spatially variant kernel including a kernel corresponding to the each pixel, based on the attention map and a spatial kernel including weight information according to a position relationship between the each pixel and a neighboring pixel, and generate a second image by applying the spatially variant kernel to the first image.

20 Claims, 18 Drawing Sheets

(51) Int. Cl.
*G06V 10/74* (2022.01)
*G06V 10/82* (2022.01)

(56) References Cited

U.S. PATENT DOCUMENTS

| | | |
|---|---|---|
| 9,741,107 B2 | 8/2017 | Xu et al. |
| 10,671,886 B2 | 6/2020 | Price et al. |
| 2019/0188586 A1 | 6/2019 | Rajabizadeh et al. |
| 2020/0342328 A1 | 10/2020 | Revaud et al. |
| 2020/0364486 A1* | 11/2020 | Park .................. G06V 10/451 |
| 2021/0104021 A1 | 4/2021 | Sohn et al. |
| 2022/0019844 A1 | 1/2022 | Park et al. |
| 2022/0284555 A1 | 9/2022 | Ahn et al. |

FOREIGN PATENT DOCUMENTS

| | | |
|---|---|---|
| KR | 101967089 B1 | 4/2019 |
| KR | 10-2020-0067631 A | 6/2020 |
| KR | 102144994 A | 8/2020 |
| KR | 10-2020-0132304 A | 11/2020 |
| KR | 1020200125468 A | 11/2020 |
| KR | 10-2022-0125124 A | 9/2022 |
| WO | 2021/097728 A1 | 5/2021 |

OTHER PUBLICATIONS

International Search Report (PCT/ISA/210) and Written Opinion (PCT/ISA/237) dated Oct. 19, 2022 issued by the International Searching Authority in International Application No. PCT/KR2022/010264.

Zhang, Y., et al., "Dual attention per-pixel filter network for spatially varying image deblurring" Digital Signal Processing, vol. 113, 2021, pp. 1-17 (18 pages).

B. Zhang, S. Jin, Y. Xia, Y. Huang and Z. Xiong, "Attention Mechanism Enhanced Kernel Prediction Networks for Denoising of Burst Images," ICASSP 2020—2020 IEEE International Conference on Acoustics, Speech and Signal Processing (ICASSP), Barcelona, Spain, 2020, pp. 2083-2087, doi: 10.1109/ICASSP40776.2020.9053332.

Ronneberger, O., Fischer, P., Brox, T., "U-Net: Convolutional Networks for Biomedical Image Segmentation", In: Navab, N., Hornegger, J., Wells, W., Frangi, A. (eds) Medical Image Computing and Computer-Assisted Intervention—MICCAI 2015. MICCAI 2015, Lecture Notes in Computer Science, vol. 9351, 2015, 8 pages, Springer, Cham. https://doi.org/10.1007/978-3-319-24574-4_28.

S. Niklaus, L. Mai and F. Liu, "Video Frame Interpolation via Adaptive Separable Convolution," 2017 IEEE International Conference on Computer Vision (ICCV), Venice, Italy, 2017, pp. 261-270, doi: 10.1109/ICCV.2017.37.

European Extended Search Report issued Oct. 31, 2024 by the European Patent Office for EP Patent Application No. 22895779.1.

* cited by examiner

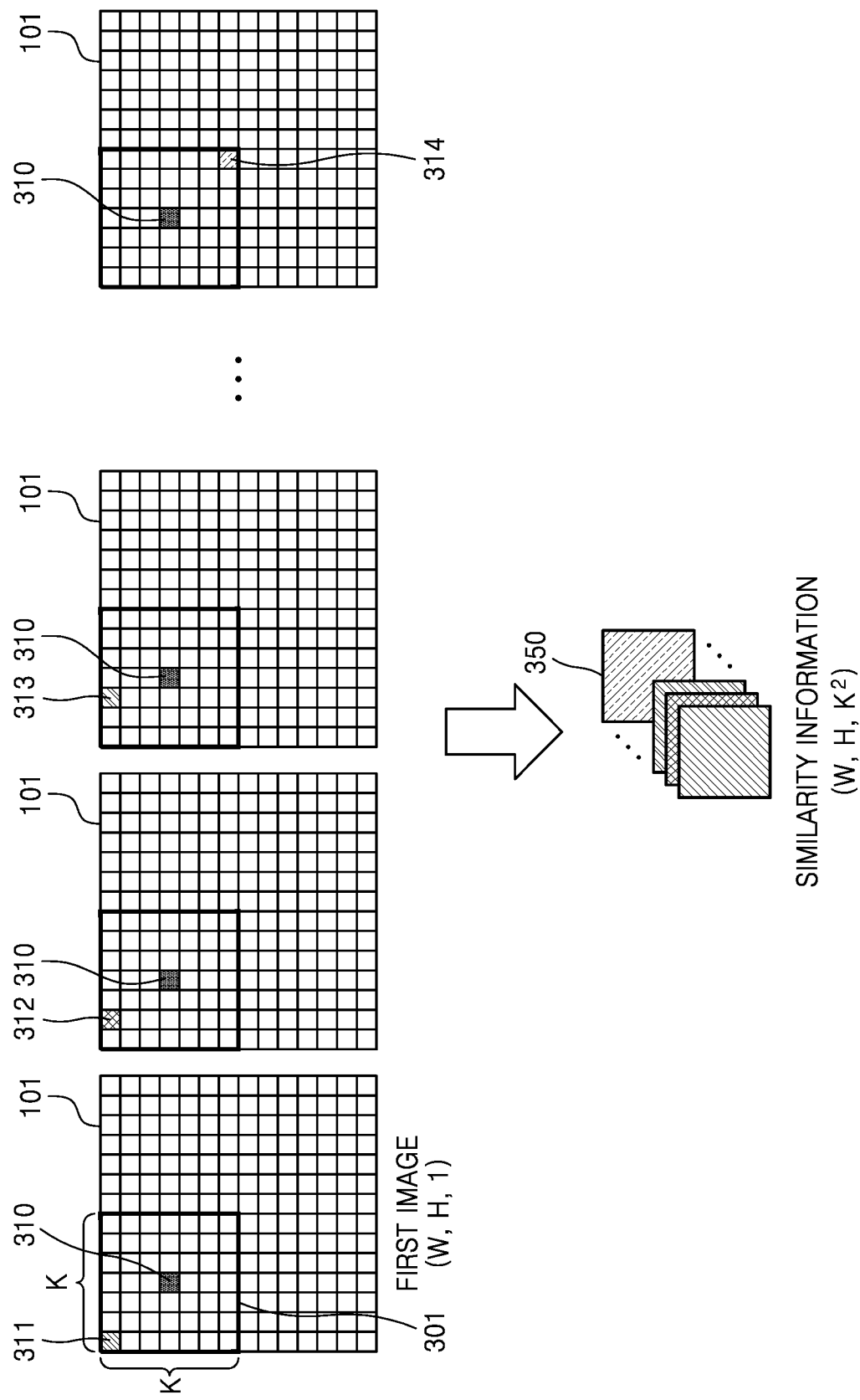

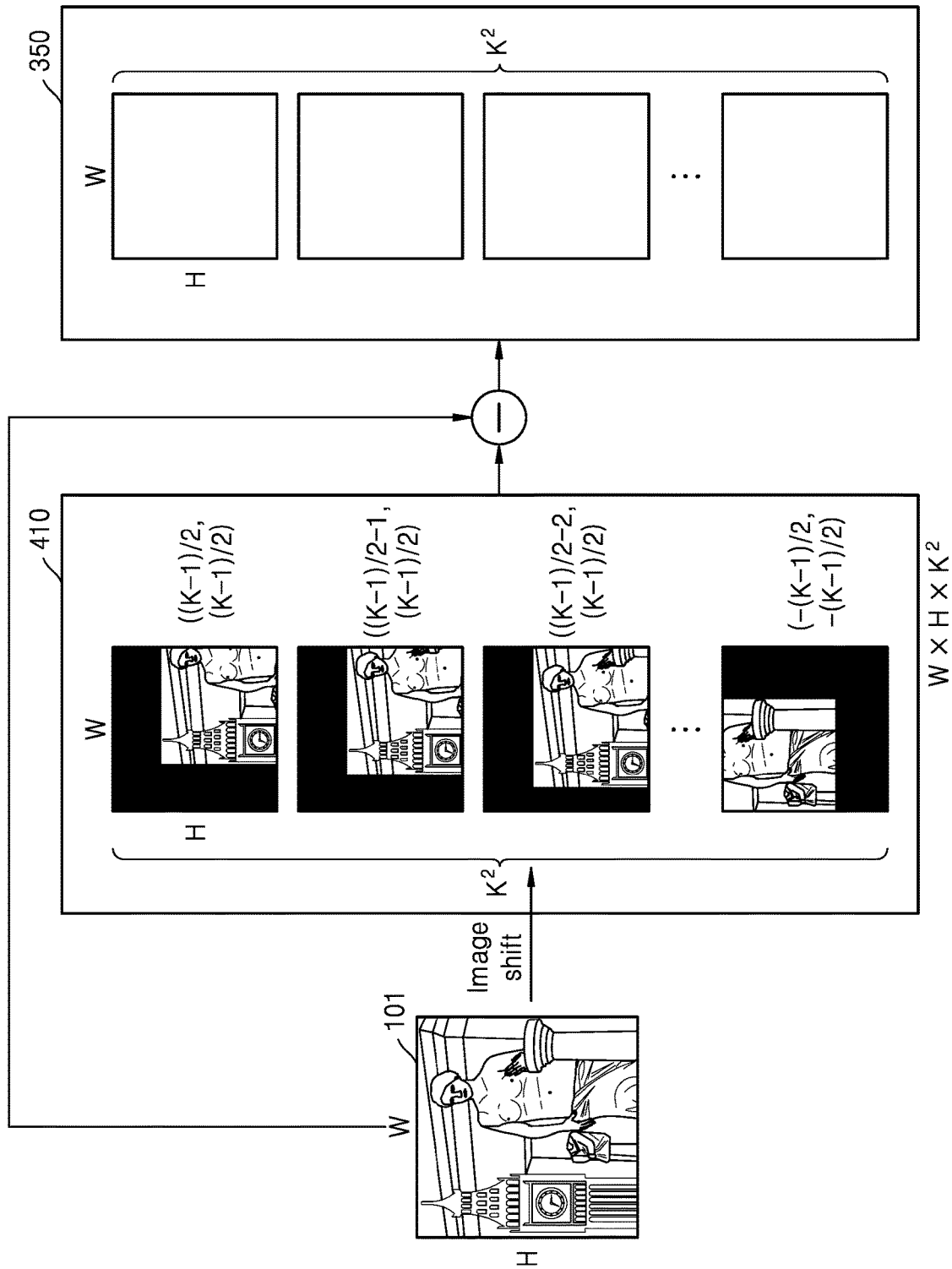

FIRST NUMBER OF OPERATIONS = 128*128*3*3((169*134+134*99+99*64)+(64*99+99*134+134*134*169)) = 17,291,280,384
THIRD NUMBER OF OPERATIONS = 128*128*((169*(3²+134)+134*(3²+99)+99*($3^2$+64))*8+64*($3^2$+99)+99*($3^2$+134)+134*($3^2$+169)) =2,099,822,592

SECOND NUMBER OF OPERATIONS = 128*128*3*3((48*16+56*20+61*24)+(24*24)+(24*32+16*48+16*28+14*40+14*28+14*40+14*41)) = 1,356,300,288

FIG. 13
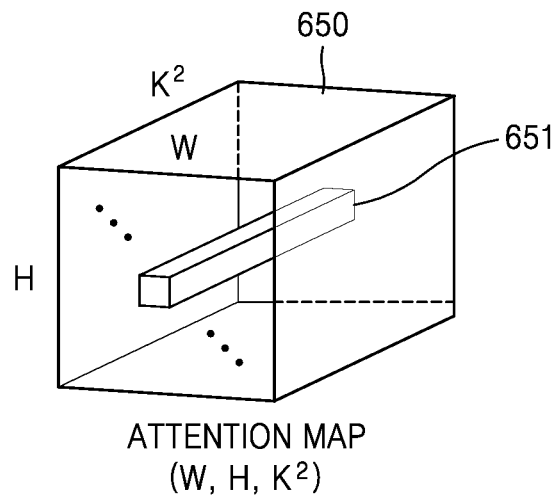
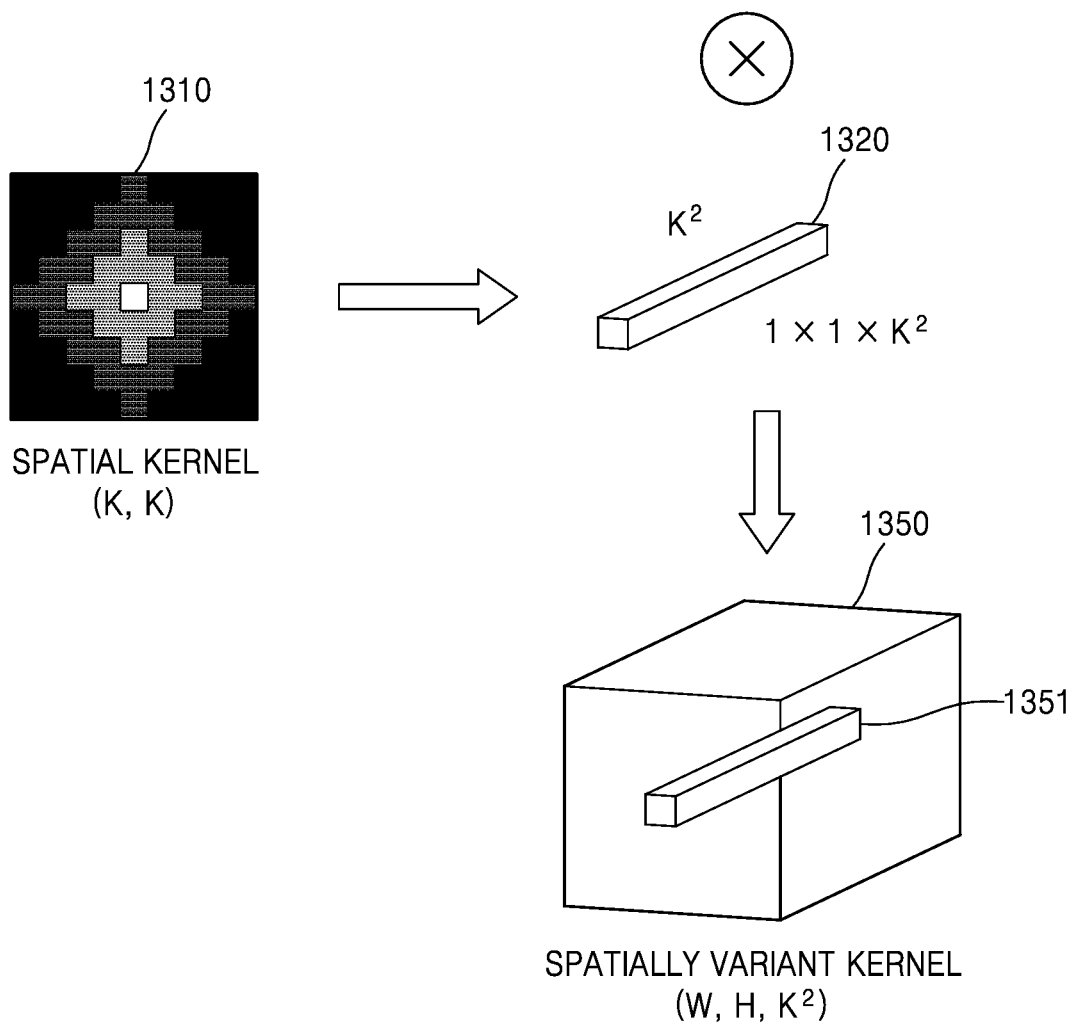

IMAGE PROCESSING APPARATUS AND OPERATING METHOD THEREOF

CROSS-REFERENCE TO RELATED APPLICATION

This application is a bypass continuation application of International Application No. PCT/KR2022/010264, filed on Jul. 14, 2022, which claims priority to Korean Patent Application No. 10-2021-0160711, filed on Nov. 19, 2021, in the Korean Intellectual Property Office, the disclosures of which are incorporated by reference herein in their entireties.

BACKGROUND

1. Field

The present disclosure relates to an image processing apparatus for improving the image quality of an image by using a neural network, and an operating method of the image processing apparatus.

2. Description of Related Art

As data traffic has increased exponentially with the development of computer technology, artificial intelligence has become an important trend to lead future innovation. Because artificial intelligence may include a method of imitating the human way of thinking, it may be infinitely applied to virtually all industries. Examples of technologies relating to artificial intelligence include pattern recognition, machine learning, expert systems, neural networks, and natural language processing.

A neural network may model the biological features of human neurons by mathematical representations and uses an algorithm imitating the human ability of learning. The neural network may generate a mapping between input data and output data through the algorithm, and the ability of generating the mapping may be represented as the learning ability of the neural network. Also, based on the learning results, the neural network has the generalization ability to generate correct output data with respect to input data that has not been used for learning.

When image processing such as image denoising is performed by using a deep neural network (e.g., a deep convolutional neural network (CNN)), when the same kernel (filter) is applied to each of the pixels included in an image, there is a problem in that the image processing performance is degraded. Accordingly, adaptive image processing may be performed by applying different kernels according to the respective features of pixels or regions included in an image. Also, when adaptive image processing is performed, because an amount of computation increases, there is a need for a method for reducing the amount of computation.

SUMMARY

Provided are an image processing apparatus capable of reducing an amount of computation when performing adaptive image processing according to features of each of pixels included in an image by using a convolutional neural network, and an operating method of the image processing apparatus.

In accordance with an aspect of the disclosure, an image processing apparatus includes memory configured to store one or more instructions; and a processor configured to execute the one or more instructions stored in the memory to: obtain characteristic information of a first image, divide the characteristic information into a plurality of groups, input each group of the plurality of groups into a respective layer of a plurality of layers included in a convolutional neural network and perform a convolution operation using one or more kernels to obtain a plurality of pieces of output information corresponding to the plurality of groups from the plurality of layers, generate an attention map including weight information corresponding to each pixel of pixels included in the first image, based on the plurality of pieces of output information, generate a spatially variant kernel including a kernel corresponding to the each pixel, based on the attention map and a spatial kernel including weight information according to a position relationship between the each pixel and a neighboring pixel, and generate a second image by applying the spatially variant kernel to the first image.

The characteristic information of the first image may include similarity information representing a similarity between the each pixel and the neighboring pixel.

The processor may be further configured to execute the one or more instructions to: obtain first similarity information based on a difference between the each pixel and a first neighboring pixel having a first relative position with respect to the each pixel, and obtain second similarity information based on a difference between the each pixel and a second neighboring pixel having a second relative position with respect to the each pixel.

The processor may be further configured to execute the one or more instructions to divide the characteristic information according to channels to obtain the plurality of groups based on the characteristic information including a plurality of pieces of channel information.

The processor may be further configured to execute the one or more instructions to: divide the plurality of pieces of channel information included in the characteristic information into a first group and a second group, input pieces of first channel information included in the first group into a first layer of the convolutional neural network, and input pieces of second channel information included in the second group into a second layer located after the first layer in the convolutional neural network.

The processor may be further configured to execute the one or more instructions to input the pieces of the second channel information and pieces of information output from the first layer into the second layer.

The processor may be further configured to execute the one or more instructions to: obtain first output information corresponding to the first group from a third layer of the convolutional neural network, and obtain second output information corresponding to the second group from a fourth layer of the convolutional neural network, the fourth layer being located after the third layer in the convolutional neural network.

The processor may be further configured to execute the one or more instructions to downscale the characteristic information of the first image and divide the downscaled characteristic information into the plurality of groups.

The processor may be further configured to execute the one or more instructions to: obtain quality information for the each pixel, obtain a plurality of output values corresponding to a plurality of pieces of preset quality information with respect to a group, obtain weights for the each pixel with respect to the plurality of output values based on the quality information for the each pixel, and apply the weights for the each pixel and sum the plurality of output values to obtain output information corresponding to the group.

Within the spatial kernel, a pixel located at a center of the spatial kernel may have a greatest value, and pixel values decrease away from the center.

A size of the spatial kernel may be K×K and a number of channels of the attention map may be $K^2$, and the processor may be further configured to execute the one or more instructions to: arrange pixel values included in the spatial kernel in a channel direction to convert the spatial kernel into a weight vector having a size of $1 \times 1 \times K^2$, and generate the spatially variant kernel by performing a multiplication operation between the weight vector and each vector of a plurality of one-dimensional vectors having the size of $1 \times 1 \times K^2$ included in the attention map.

A number of kernels included in the spatially variant kernel may be same as a number of pixels included in the first image.

The processor may be further configured to execute the one or more instructions to generate the second image by: performing filtering by applying a first kernel included in the spatially variant kernel to a first region centered on a first pixel included in the first image, and performing filtering by applying a second kernel included in the spatially variant kernel to a second region centered on a second pixel included in the first image.

In accordance with an aspect of the disclosure an operating method of an image processing apparatus includes obtaining characteristic information of a first image; dividing the characteristic information into a plurality of groups; inputting each group of the plurality of groups into a respective layer of a plurality of layers included in a convolutional neural network and performing a convolution operation using one or more kernels to obtain a plurality of pieces of output information corresponding to the plurality of groups from the plurality of layers; generating an attention map including weight information corresponding to each pixel of pixels included in the first image, based on the plurality of pieces of output information; generating a spatially variant kernel including a kernel corresponding to the each pixel, based on the attention map and a spatial kernel including weight information according to a position relationship between the each pixel and a neighboring pixel; and generating a second image by applying the spatially variant kernel to the first image.

The obtaining of the characteristic information of the first image may include obtaining similarity information representing a similarity between the each pixel included in the first image and the neighboring pixel.

The obtaining of the similarity information may include: obtaining first similarity information based on a difference between the each pixel included in the first image and a first neighboring pixel having a first relative position with respect to the each pixel; and obtaining second similarity information based on a difference between the each pixel included in the first image and a second neighboring pixel having a second relative position with respect to the each pixel.

The dividing of the characteristic information into the plurality of groups may include dividing the characteristic information according to channels to obtain the plurality of groups based on the characteristic information including a plurality of pieces of channel information.

The dividing of the characteristic information into the plurality of groups may further include dividing the plurality of pieces of channel information included in the characteristic information into a first group and a second group, and the obtaining of the plurality of pieces of output information may include: inputting pieces of first channel information included in the first group into a first layer of the convolutional neural network; and inputting pieces of second channel information included in the second group into a second layer located after the first layer in the convolutional neural network.

The obtaining of the plurality of pieces of output information may further include inputting the pieces of the second channel information and pieces of information output from the first layer into the second layer.

The obtaining of the plurality of pieces of output information may further include: obtaining first output information corresponding to the first group from a third layer of the convolutional neural network; and obtaining second output information corresponding to the second group from a fourth layer of the convolutional neural network, the fourth layer being located after the third layer in the convolutional neural network.

The dividing of the characteristic information into the plurality of groups may include: downscaling the characteristic information of the first image; and dividing the downscaled characteristic information into the plurality of groups.

The operating method may further include obtaining quality information for the each pixel; obtaining a plurality of output values corresponding to a plurality of pieces of preset quality information with respect to a group; and obtaining weights for the each pixel with respect to the plurality of output values based on the quality information for the each pixel, wherein the obtaining of the plurality of pieces of output information may include applying the weights for the each pixel and summing the plurality of output values to obtain output information corresponding to the group.

With the spatial kernel, a pixel located at a center of the spatial kernel may have a greatest value and pixel values decrease away from the center.

A size of the spatial kernel may be K×K and a number of channels of the attention map may be $K^2$, and the generating of the spatially variant kernel may include: arranging pixel values included in the spatial kernel in a channel direction to convert the spatial kernel into a weight vector having a size of $1 \times 1 \times K^2$; and generating the spatially variant kernel by performing a multiplication operation between the weight vector and each vector of a plurality of one-dimensional vectors having a size of $1 \times 1 \times K^2$ included in the attention map.

A number of kernels included in the spatially variant kernel may be same as a number of pixels included in the first image.

The generating of the second image may include: performing filtering by applying a first kernel included in the spatially variant kernel to a first region centered on a first pixel included in the first image; and performing filtering by applying a second kernel included in the spatially variant kernel to a second region centered on a second pixel included in the first image.

In accordance with an aspect of the disclosure, a non-transitory computer-readable recording medium is configured to store instructions which, when executed by at least one processor, cause the at least one processor to obtain characteristic information of a first image; divide the characteristic information into a plurality of groups; input each group of the plurality of groups into a respective layer of a plurality of layers included in a convolutional neural network and performing a convolution operation using one or more kernels to obtain a plurality of pieces of output information corresponding to the plurality of groups from the plurality of layers; generate an attention map including weight information corresponding to each pixel of pixels included in the first image, based on the plurality of pieces of output information; generate a spatially variant kernel including a kernel corresponding to the each pixel, based on the attention map and a spatial kernel including weight information according to a position relationship between the each pixel and a neighboring pixel; and generate a second image by applying the spatially variant kernel to the first image.

In accordance with an aspect of the disclosure, an image processing apparatus includes a memory configured to store one or more instructions; and a processor configured to execute the one or more instructions stored in the memory to: obtain characteristic information of a first image, divide the characteristic information into a plurality of groups, input a group of the plurality of groups into a layer in a convolutional neural network and perform a convolution operation using one or more kernels to obtain output information corresponding to the group from the layer, generate an attention map including weight information corresponding to a pixel included in the first image, based on the output information, generate a spatially variant kernel including a kernel corresponding to the pixel, based on the attention map and a spatial kernel including weight information according to a position relationship between the pixel and a neighboring pixel, and generate a second image by applying the spatially variant kernel to the first image.

According to an embodiment of the disclosure, the image processing apparatus may perform denoising for removing noise while maintaining the fine edge processing and texture of an input image, by using a convolutional neural network. In this case, compared to the existing denoising based on the convolutional neural network, the operation amount may be reduced while similarly maintaining the image processing performance.

According to an embodiment of the disclosure, adaptive image processing may be performed by applying different kernels according to the quality information for the respective regions included in the image. In this case, compared to the existing adaptive image processing based on the quality information, the operation amount may be reduced while similarly maintaining the image processing performance.

BRIEF DESCRIPTION OF DRAWINGS

The above and other aspects, features, and advantages of certain embodiments of the present disclosure will be more apparent from the following description taken in conjunction with the accompanying drawings, in which:

FIG. 3 is a diagram referenced to describe a method of generating similarity information, according to an embodiment.

FIGS. 4A and 4B are diagrams referenced to describe methods of obtaining similarity information, according to another embodiment.

FIG. 13 is a diagram referenced to describe a method of generating a spatially variant kernel, according to an embodiment.

DETAILED DESCRIPTION

Figure 1:
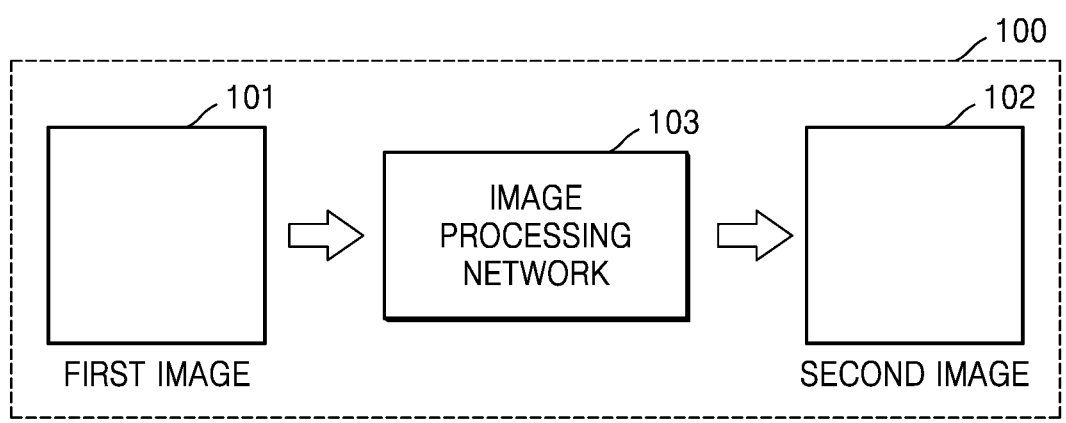
FIG. 1 is a diagram illustrating an operation in which an image processing apparatus processes an image by using an image processing network, according to an embodiment.

Throughout the disclosure, the expression "at least one of a, b, or c" indicates only a, only b, only c, both a and b, both a and c, both b and c, all of a, b, and c, or variations thereof.

Terms used herein will be briefly described and then the disclosure will be described in detail.

The terms used herein are those general terms currently widely used in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

Throughout the specification, when something is referred to as "including" an element, another element may be further included unless specified otherwise. Also, as used herein, the terms such as "units" and "modules" may refer to units that perform at least one function or operation, and the units may be implemented as hardware or software or a combination of hardware and software.

Hereinafter, embodiments of the disclosure will be described in detail with reference to the accompanying drawings so that those of ordinary skill in the art may easily implement the embodiments. However, the disclosure may be embodied in many different forms and should not be construed as being limited to the embodiments set forth herein. Also, portions irrelevant to the description of the disclosure will be omitted in the drawings for a clear description of the disclosure, and like reference numerals will denote like elements throughout the specification.

FIG. 1 is a diagram illustrating an operation in which an image processing apparatus processes an image by using an image processing network, according to an embodiment of the disclosure.

Referring to FIG. 1, an image processing network 103 according to an embodiment of the disclosure may receive a first image 101 and process the first image 101 to generate a second image 102. In this case, the first image 101 may be an image including noise or may be a low-resolution image. An image processing apparatus 100 may use the image processing network 103 to perform denoising for removing noise while maintaining a fine edge and texture of the first image 101, thereby generating the second image 102. The second image 102 may be a higher-resolution image than the first image 101 and may be an image with an improved quality compared to the first image 101.

An image processing performed by the image processing network 103 according to an embodiment of the disclosure will be described below in detail with reference to the drawings.

Figure 2:
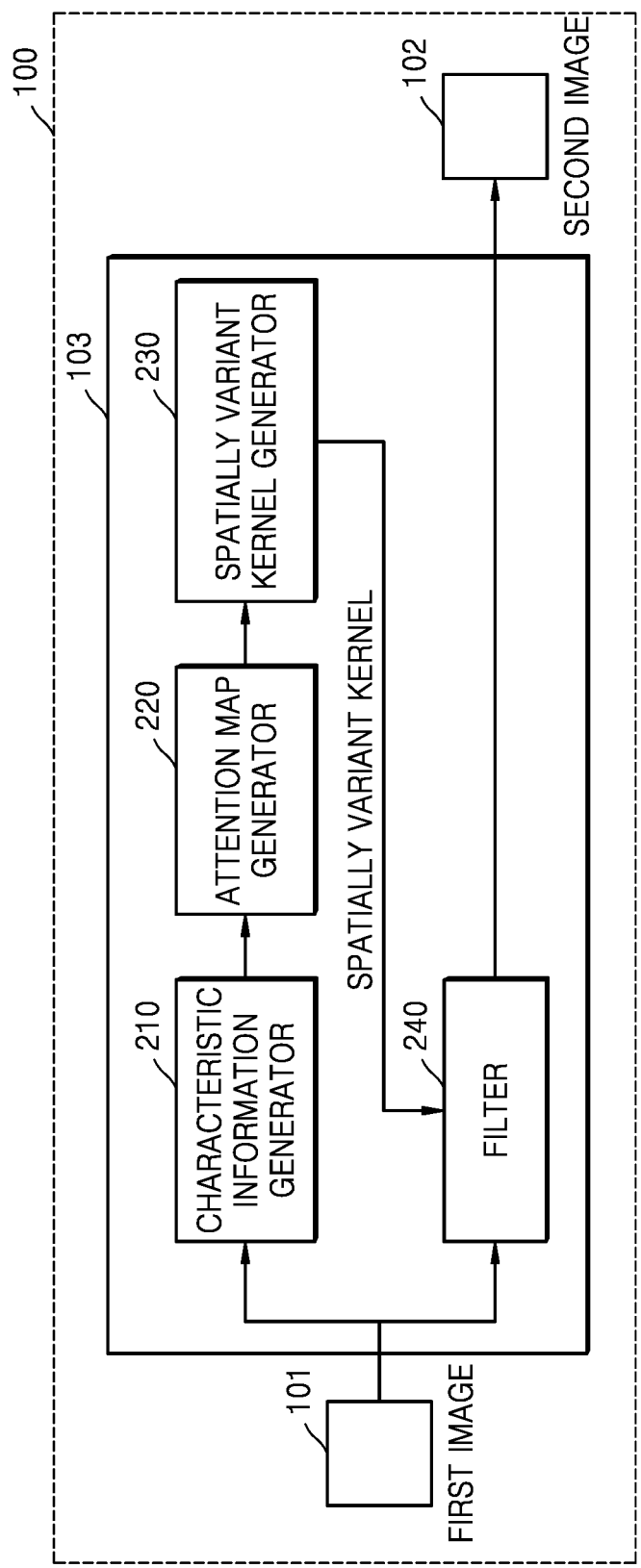
FIG. 2 is a diagram illustrating an image processing network according to an embodiment.

FIG. 2 is a diagram illustrating an image processing network according to an embodiment of the disclosure.

Referring to FIG. 2, the image processing network 103 according to an embodiment of the disclosure may include a characteristic information generator 210, an attention map generator 220, a spatially variant kernel generator 230, and a filter 240.

According to an embodiment of the disclosure, the image processing network 103 may include a structure for receiving the first image 101 and outputting the second image 102.

According to an embodiment of the disclosure, the characteristic information generator 210 may obtain characteristic information of the first image 101. For example, the characteristic information of the first image 101 may include similarity information between each of the pixels included in the first image 101 and a neighboring pixel. In this case, the similarity information may be information representing the difference between a pixel value of each of the pixels and a pixel value of a neighboring pixel located near each of the pixels. A method of generating the similarity information will be described in detail with reference to FIGS. 3 to 4B.

Also, the characteristic information of the first image 101 may include frequency characteristic information of the first image 101. A method of generating the frequency characteristic information of the first image 101 will be described in detail with reference to FIG. 5.

Also, the characteristic information of the first image 101 may include domain transformation information of the first image 101, gradient characteristic information of the first image 101, region characteristic information of the first image 101, or the like, but embodiments are not limited thereto.

FIG. 3 is a diagram referenced to describe a method of generating similarity information, according to an embodiment of the disclosure.

According to an embodiment of the disclosure, the characteristic information generator 210 may generate similarity information by calculating the difference between each of the pixels included in the first image 101 and a neighboring pixel. For convenience of description, in embodiments of the disclosure, it will be assumed that the width of the first image 101 is W, the height thereof is H, and the number of channels is 1.

Referring to FIG. 3, the characteristic information generator 210 may calculate a difference value between a first pixel 310 and each of $K^2$ pixels included in a first region 301 centered on the first pixel 310 among a plurality of pixels included in the first image 101. In this case, K×K that is the size of the first region 301 may be determined based on the size of a spatial kernel described below.

The characteristic information generator 210 may obtain $K^2$ difference values with respect to the first pixel 310 by calculating a difference value between the first pixel 310 and each of $K^2$ pixels included in the first region 301. For example, as illustrated in FIG. 3, the characteristic information generator 210 may calculate a difference value between the first pixel 310 and a first neighboring pixel 311, a difference value between the first pixel 310 and a second neighboring pixel, a difference value between the first pixel 310 and a third neighboring pixel 313, and a difference value between the first pixel 310 and a fourth neighboring pixel 314. In the same way, the characteristic information generator 210 may obtain $K^2$ difference values with respect to each of other pixels included in the first image 101, other than the first pixel 310. For example, the characteristic information generator 210 may obtain $K^2$ difference values from neighboring pixels by using each of other pixels other than the first pixel 310 as a center pixel.

The characteristic information generator 210 may arrange $K^2$ difference values for each of the pixels in similarity information 350 in the channel direction of the corresponding pixel, and accordingly, the size of the similarity information 350 may be W×H and the number of channels may be $K^2$.

According to an embodiment of the disclosure, a first channel image of the similarity information 350 may represent a difference value between each of the pixels included in the first image 101 and a neighboring pixel having a first relative position with respect to each of the pixels (e.g., a pixel at a position shifted by (K−1)/2 pixels to the left side and by (K−1)/2 pixels to the upper side with respect to each of the pixels). Also, a second channel image of the similarity information 350 may represent a difference value between each of the pixels included in the first image 101 and a neighboring pixel having a second relative position with respect to each of the pixels (e.g., a pixel at a position shifted by (K−1)/2−1 pixels to the left side and by (K−1)/2 pixels to the upper side with respect to each of the pixels). However, the disclosure is not limited thereto.

Figure 4B:
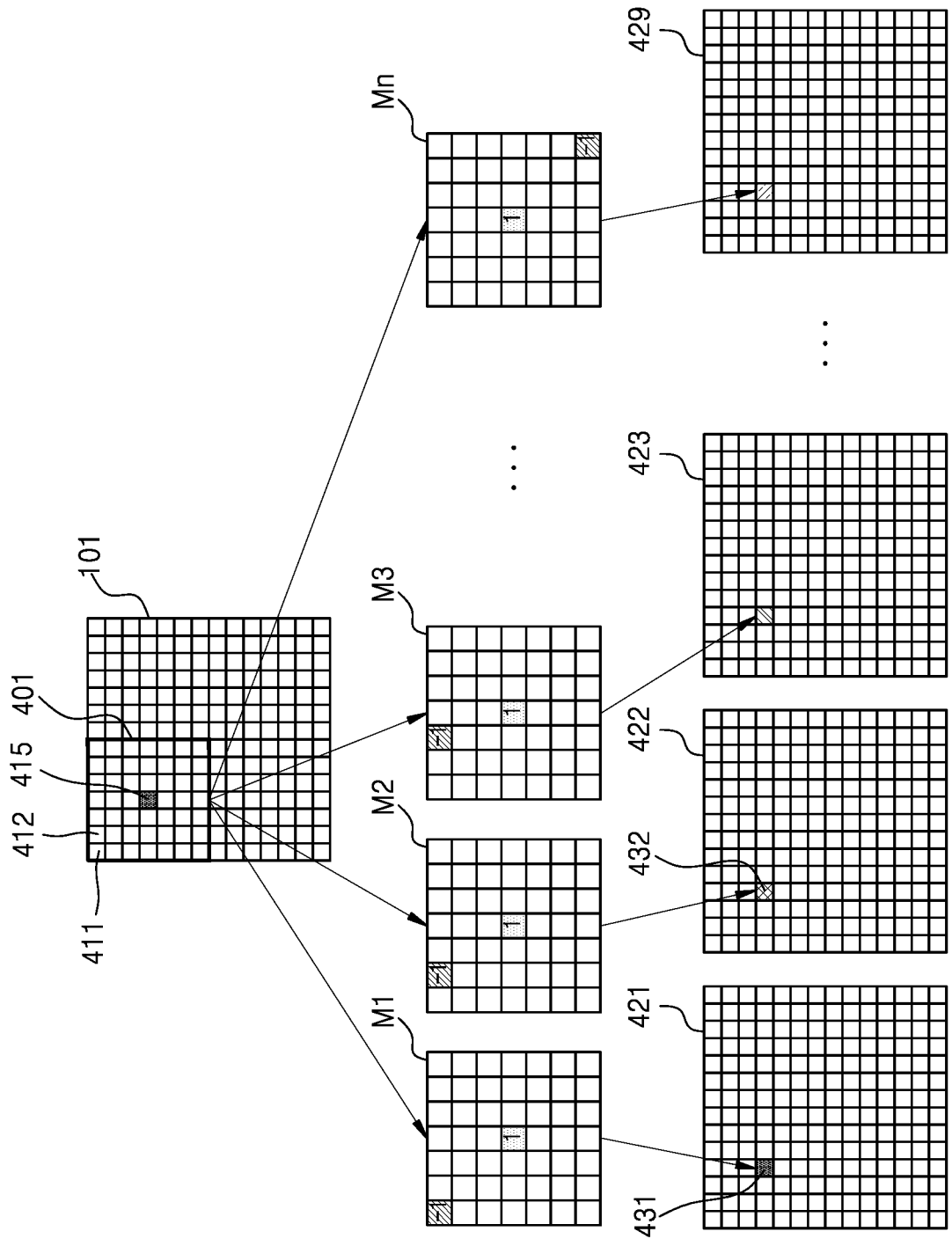

FIGS. 4A and 4B are diagrams referenced to describe methods of obtaining similarity information, according to another embodiment of the disclosure.

Referring to FIG. 4A, the characteristic information generator 210 according to an embodiment of the disclosure may obtain $K^2$ images by horizontally shifting each of the pixels included in the first image 101 by p pixels (−(K−1)/2≤p≤(K−1)/$K^2$ images, where p is an integer) and vertically shifting each of the pixels by q pixels (−(K−1)/2≤q≤(K−1)/2, where q is an integer). In this case, each of the $K^2$ images 410 may have the same size (W×H) as the first image 101.

The characteristic information generator 210 may obtain similarity information 350 by calculating a difference image between each of the $K^2$ images 410 and the first image 101. Accordingly, as described with reference to FIG. 3, the size of the similarity information 350 may be W×H and the number of channels may be $K^2$.

Referring to FIG. 4B, the characteristic information generator 210 according to an embodiment of the disclosure may obtain similarity information by performing mask processing on the first image 101.

The mask processing may be performed through a convolution operation between the first image 101 and each of mask filters M1, M2, M3, . . . , Mn. In this case, "n" may be $K^2$−1, and $K^2$−1 channel images 421, 422, 423, . . . , 429 included in the similarity information 350 may be generated through the mask processing based on $K^2-1$ mask filters. For example, the characteristic information generator 210 may generate a first channel image 421 of the similarity information 350 through a convolution operation between the first image 101 and a first mask filter M1 and generate a second channel image 422 of the similarity information 350 through a convolution operation between the first image 101 and a second mask filter M2. Also, the characteristic information generator 210 may generate a third channel image 423 of the similarity information 350 through a convolution operation between the first image 101 and a third mask filter M3 and generate a (K−1)th channel image 429 of the similarity information 350 through a convolution operation between the first image 101 and an n-th mask filter Mn.

Referring to FIG. 4B, the characteristic information generator 210 may calculate a pixel value included in the similarity information 350 by respectively multiplying and summing K×K pixel values included in a first region 401 of the first image 101 and K×K pixel values (parameter values) included in each of the mask filters.

In this case, the parameter values included in the mask filter may be determined according to the position of a neighboring pixel for calculating the similarity information 350. For example, the first mask filter M1 may be a mask filter for calculating similarity information between a center pixel and a neighboring pixel having a first relative position with respect to the center pixel (e.g., a position shifted by (K−1)/2 pixels to the left side and by (K−1)/2 pixels to the upper side with respect to a reference pixel). Accordingly, in the first mask filter M1, a center pixel value may be '1', a pixel value having a first relative position with respect to the center pixel may be '−1', and the other pixel values may be '0'.

According to an embodiment of the disclosure, the characteristic information generator 210 may calculate a value of a second pixel 431 included in the first channel image 421 of the similarity information 350 by performing a convolution operation between the first mask filter M1 and the first region 401 centered on a first pixel 415. In this case, the position of the first pixel 415 in the first image 101 may be equal to the position of the second pixel 431 in the first channel image 421 of the similarity information 350. The value of the second pixel 431 included in the first channel image 421 may be obtained by subtracting the value of a pixel 411 having a first relative position with respect to the first pixel 415 from the value of the first pixel 415.

According to the convolution operation based on the first mask filter M1, as the first mask filter M1 slides in the horizontal direction and the vertical direction, each of the pixels included in the first image 101 may be located at the center of the first mask filter M1. In this case, a reference pixel may be located at the center of a region covered by the first mask filter M1 sliding and shifting over the first image 101. The characteristic information generator 210 may calculate pixel values included in the first channel image 421 by performing a convolution operation between a changed region and the first mask filter M1.

Also, the second mask filter M2 may be a mask filter for calculating similarity information between a center pixel and a neighboring pixel having a second relative position with respect to the center pixel (e.g., a position shifted by (K−1)/2−1 pixels to the left side and by (K−1)/2 pixels to the upper side with respect to a reference pixel). Accordingly, in the second mask filter M2, a center pixel value may be '1', a pixel value having a second relative position with respect to the center pixel may be '−1', and the other pixel values may be '0'.

The characteristic information generator 210 may calculate a value of a third pixel 432 included in the second channel image 422 of the similarity information 350 by performing a convolution operation between the second mask filter M2 and the first region 401 centered on the first pixel 415. In this case, the position of the first pixel 415 in the first image 101 may be equal to the position of the third pixel 432 in the second channel image 422. Accordingly, the value of the third pixel 432 included in the second channel image 422 may be obtained by subtracting the value of a pixel 412 having a second relative position with respect to the first pixel 415 from the value of the first pixel 415.

In the same way, a region to be subjected to a convolution operation may be changed such that each of the pixels included in the first image 101 may be located at the center of the region to be subjected to the convolution operation, and pixel values included in the second channel image 422 may be calculated by performing a convolution operation between the second mask filter M2 and the changed region.

Also, the third mask filter M3 may be a mask filter for calculating similarity information between a center pixel and a neighboring pixel having a third relative position with respect to the center pixel, and the n-th mask filter Mn may be a mask filter for calculating similarity information between a center pixel and a neighboring pixel having an n-th relative position with respect to the center pixel.

As illustrated and described in FIG. 4B, by performing mask processing by using $K^2-1$ mask filters, the characteristic information generator 210 according to an embodiment of the disclosure may obtain similarity information including difference values between each of the pixels included in the first image 101 and neighboring pixels having first to $(K^2-1)$th relative positions with respect to each of the pixels. For example, the characteristic information generator 210 may generate the first to $(K^2-1)$th channel images 421, 422, 423, . . . , 429 of the similarity information 350 by using the first to $(K^2-1)$th mask filters M1, M2, M3, . . . , Mn.

Also, the similarity information 350 according to an embodiment of the disclosure may include a $K^2$-th channel image representing similarity information with respect to itself with respect to each of the pixels included in the first image 101. Thus, all pixel values of the $K^2$-th channel image may be '0'.

Moreover, the methods of obtaining the similarity information 350 illustrated and described in FIGS. 3, 4A, and 4B are merely examples, and the characteristic information generator 210 may use various methods to obtain similarity information between each of the pixels included in the first image 101 and a neighboring pixel.

Figure 5:
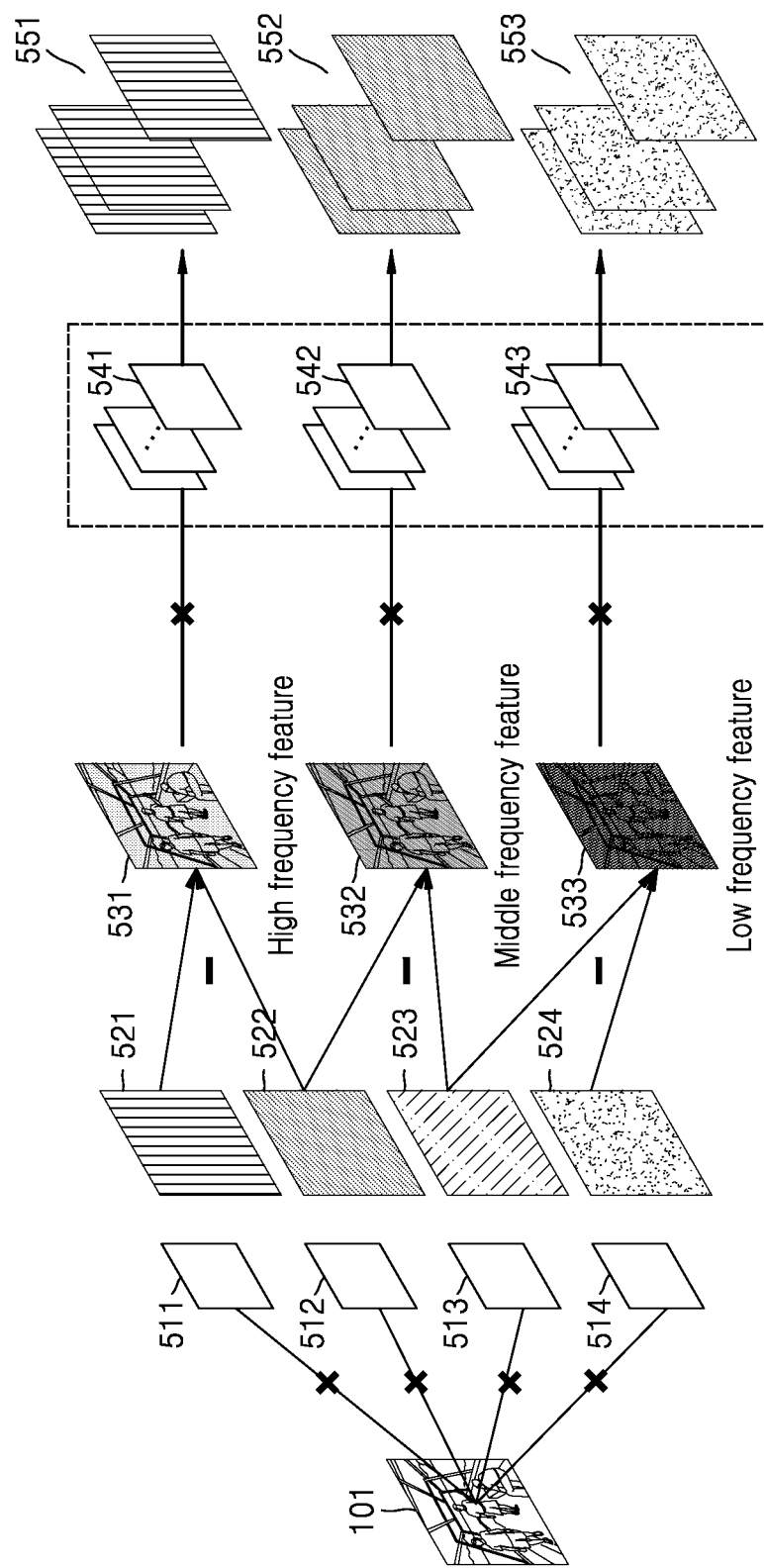
FIG. 5 is a diagram for describing a method of generating frequency characteristic information of a first image, according to an embodiment.

FIG. 5 is a diagram for describing a method of generating frequency characteristic information of a first image, according to an embodiment of the disclosure.

According to an embodiment of the disclosure, the characteristic information generator 210 may generate frequency characteristic information of the first image 101. For example, the characteristic information generator 210 may obtain at least one piece of characteristic information by performing filtering on the first image 101.

For example, the characteristic information generator 210 may obtain frequency characteristic information by performing filtering based on a Gaussian kernel or a discrete cosine transform (DCT) or a wavelet transform or the like.

Referring to FIG. 5, the characteristic information generator 210 may perform a convolution operation by applying four filter kernels 511, 512, 513, and 514 to the first image 101. The characteristic information generator 210 may obtain first filtering information 521 by performing a convolution operation between the first image 101 and a first filter kernel 511, may obtain second filtering information 522 by performing a convolution operation between the first image 101 and a second filter kernel 512, may obtain third filtering information 523 by performing a convolution operation between the first image 101 and a third filter kernel 513, and may obtain fourth filtering information 524 by performing a convolution operation between the first image 101 and a fourth filter kernel 514. In FIG. 5, four filter kernels are illustrated and described; however, the disclosure is not limited thereto. Also, the filter kernels may be Gaussian kernels but are not limited thereto.

According to an embodiment of the disclosure, weight values of the filter kernels 511, 512, 513, and 514 for filtering the first image 101 may be preset values.

The characteristic information generator 210 may obtain first frequency characteristic information 531 by calculating the difference between the first filtering information 521 and the second filtering information 522, may obtain second frequency characteristic information 532 by calculating the difference between the second filtering information 522 and the third filtering information 523, and may obtain third frequency characteristic information 533 by calculating the difference between the third filtering information 523 and the fourth filtering information 524.

In this case, the first frequency characteristic information 531 may be high frequency characteristic information, the second frequency characteristic information 532 may be middle frequency characteristic information, and the third frequency characteristic information 533 may be low frequency characteristic information.

Also, the characteristic information generator 210 according to an embodiment of the disclosure may extract at least one piece of sub-feature information from the first to third frequency characteristic information 531, 532, and 533. For example, the characteristic information generator 210 may extract first sub-frequency feature information 551 through a convolution operation between the first frequency characteristic information 531 and a first sub-kernel 541 and may extract second sub-frequency feature information 552 through a convolution operation between the second frequency characteristic information 532 and a second sub-kernel 542. Also, the characteristic information generator 210 may extract third sub-frequency characteristic information 553 through a convolution operation between the third frequency characteristic information 533 and a third sub-kernel 543.

According to an embodiment of the disclosure, the characteristic information of the first image 101 may include a plurality of pieces of frequency characteristic information (e.g., the first to third frequency characteristic information 531, 532, and 533) or a plurality of pieces of sub-frequency characteristic information (e.g., the first to third sub-frequency characteristic information 551, 552, and 553).

Also, the characteristic information generator 210 may generate gradient characteristic information of the first image 101. Gradient features according to an embodiment of the disclosure may be determined based on the feature of an edge appearing in each of the pixels included in the first image and may include at least one of strength feature, angle feature, or coherence. For example, the strength feature may be determined such that the strength may increase as the edge becomes sharper. The angle feature may represent the direction of the edge. The coherence may represent a measure of how directional the edge is. The coherence may be higher when the edge is straight than when the edge is curved.

According to an embodiment of the disclosure, the characteristic information generator 210 may determine the gradient feature of the first image based on the eigen values and eigen vectors calculated through the eigen component analysis for the gradient value of each of the pixels included in the first image.

According to an embodiment of the disclosure, the characteristic information of the first image may include a plurality of pieces of gradient characteristic information of the first image.

Referring back to FIG. 2, the attention map generator 220 may generate an attention map based on the characteristic information. Hereinafter, for convenience of description, a case where the characteristic information of the first image is similarity information will be described as an example.

According to an embodiment of the disclosure, the attention map generator 220 may generate an attention map based on the similarity information. When the attention map is generated based on the similarity information, the image quality of an image-processed image may be improved by using the attention map generated to give a great weight to neighboring pixels having similar pixel values, for image processing.

The attention map generator 220 may generate an attention map representing weight information corresponding to each of the pixels based on the similarity information between each of the pixels included in the first image and neighboring pixels. A method of generating the attention map will be described in detail with reference to FIG. 6.

Figure 6:
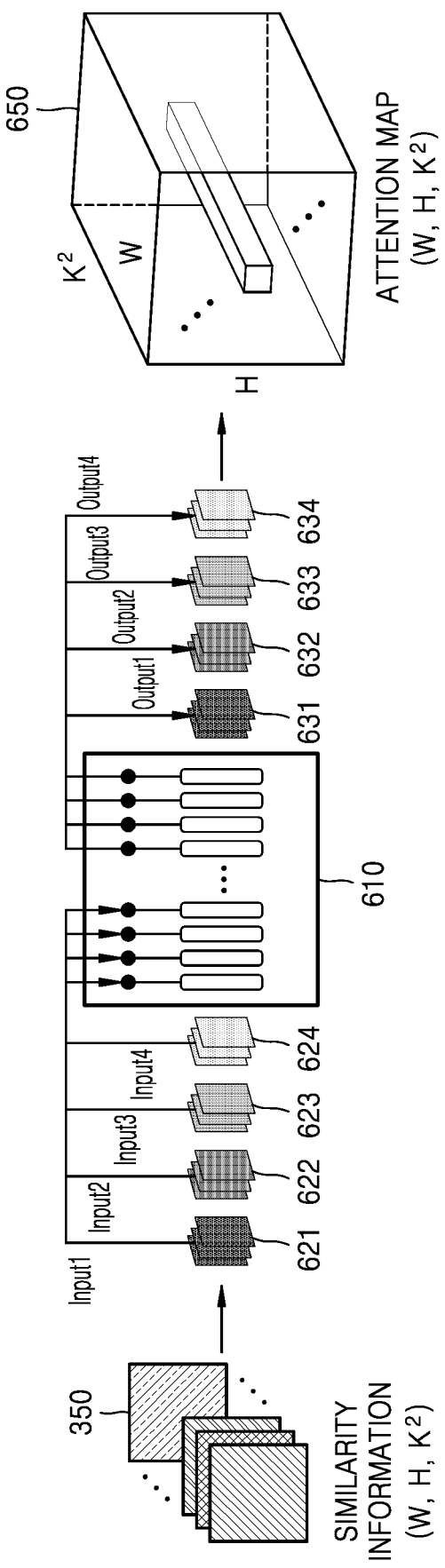
FIG. 6 is a diagram referenced to describe a method of generating an attention map, according to an embodiment.

FIG. 6 is a diagram referenced to describe a method of generating an attention map, according to an embodiment of the disclosure.

Referring to FIG. 6, the attention map generator 220 may generate an attention map 650 by using a convolutional neural network 610. The convolutional neural network 610 according to an embodiment of the disclosure may include one or more layers and may receive the characteristic information obtained by the characteristic information generator 210 according to an embodiment of the disclosure. In this case, the characteristic information may be divided into a plurality of groups, and the plurality of divided groups may be respectively input into different layers.

In FIG. 6, the characteristic information will be described as similarity information. As illustrated in FIG. 6, the similarity information 350 having $K^2$ channels may be divided into a first group, a second group, a third group, and a fourth group in units of channels and then may be input into different layers included in the convolutional neural network 610. For example the first group may be input as first input information 621 (illustrated as Input1), the second group may be input as second input information 622 (illustrated as Input2), the third group may be input as third input information 623 (illustrated as Input3), and the fourth group may be input as fourth input information 624 (illustrated as Input4). Although the description has been given with respect to the similarity information 350 in FIG. 6, even when the characteristic information is frequency characteristic information, gradient characteristic information, or the like, the characteristic information may be divided into a plurality of groups and then may be input into different layers included in the convolutional neural network 610.

Moreover, a method of dividing the similarity information 350 into a plurality of groups will be described in detail with reference to FIG. 7.

Also, referring to FIG. 6, the attention map generator 220 according to an embodiment of the disclosure may input a plurality of pieces of input information 621, 622, 623, and 624 in different layers included in the convolutional neural network 610. For example, first input information 621, second input information 622, third input information 623, and fourth input information 624 may be input into different layers. The attention map generator 220 may perform an operation on the plurality of pieces of input information 621, 622, 623, and 624 by using the convolutional neural network 610. Each of the layers included in the convolutional neural network 610 may have a structure for receiving the values output from the previous layer, performing an operation in the corresponding layer to obtain result values, and outputting the obtained result values to the next layer.

Also, referring to FIG. 6, the attention map generator 220 may obtain a plurality of pieces of output information 631, 632, 633, and 634 corresponding to the plurality of pieces of input information 621, 622, 623, and 624 from different layers included in the convolutional neural network 610. For example, first output information 631 (illustrated as Output1), second output information 632 (illustrated as Output2), third output information 633 (illustrated as Output3), and fourth output information 634 (illustrated as Output4) may be output from different layers.

The attention map generator 220 may generate the attention map 650 based on a plurality of pieces of output information. A method of generating the attention map 650 based on the plurality of pieces of output information will be described below in detail with reference to FIG. 9. The size of the attention map 650 generated by the attention map generator 220 may be W×H, and the number of channels may be $K^2$.

Figure 7:
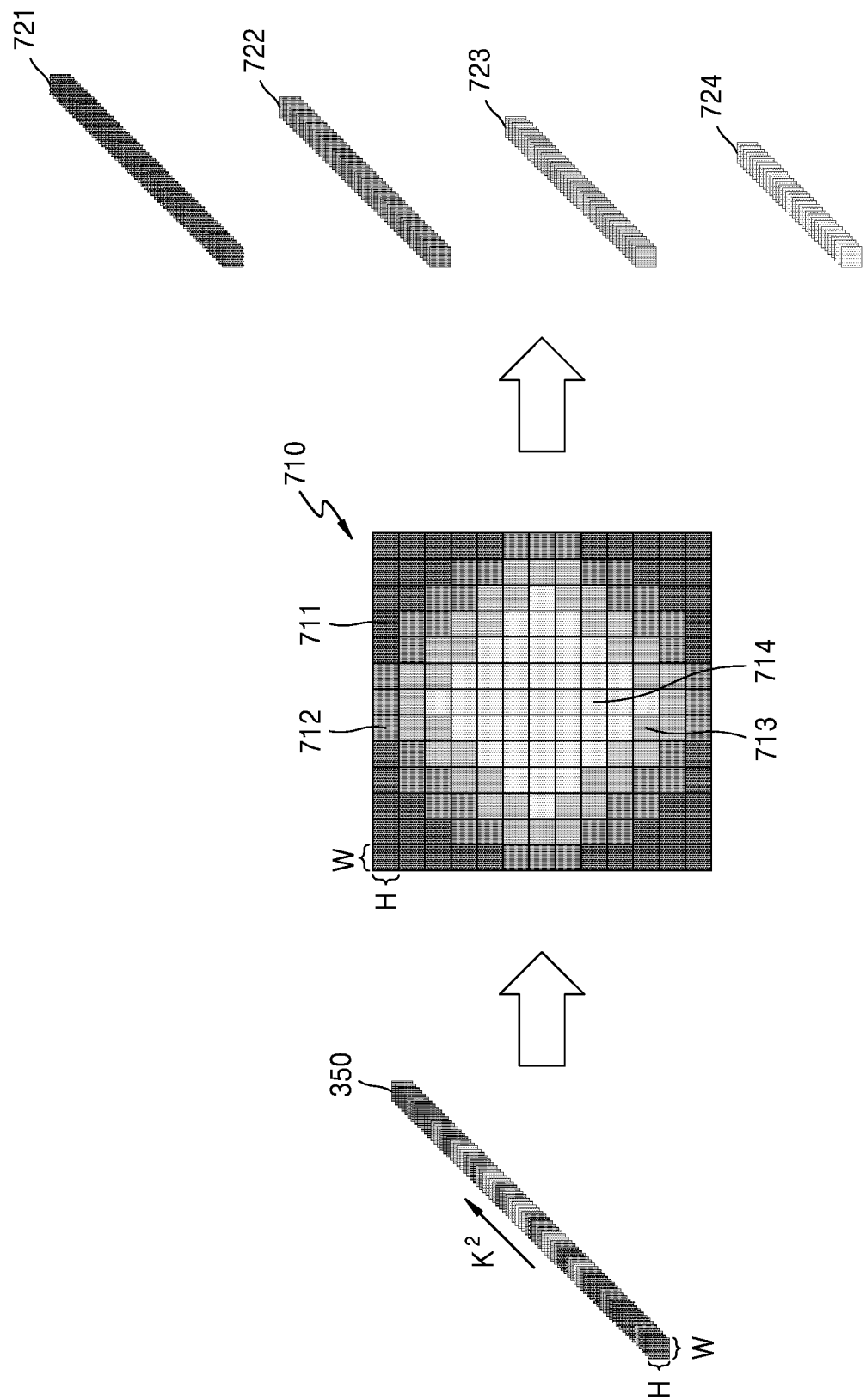
FIG. 7 is a diagram for describing a method of dividing similarity information into a plurality of groups, according to an embodiment.

FIG. 7 is a diagram for describing a method of dividing similarity information into a plurality of groups, according to an embodiment of the disclosure.

Referring to FIG. 7, the size of the similarity information 350 according to an embodiment of the disclosure may be W×H, and the number of channels may be $K^2$. Also, the similarity information 350 may be divided into a plurality of groups according to the channel-wise characteristic value included in the similarity information 350. For example, as illustrated in FIG. 7, each of the channels included in the similarity information 350 may have an intensity value. In this case, the channel-wise intensity may be obtained by summing all pixel values included in one channel; however, the disclosure is not limited thereto.

The attention map generator 220 may divide the similarity information 350 into a plurality of groups in units of channels according to the channel-wise intensity. For example, the attention map generator 220 may divide the similarity information 350 into a first group, a second group, a third group, and a fourth group according to the channel-wise intensity level.

Referring to FIG. 7, the channels included in the similarity information 350 according to an embodiment of the disclosure may include channel numbers (indexes) in order, and for example, a channel number '0' may be assigned to the first channel included in the similarity information 350 and a channel number '$K^2$−1' may be assigned to the last channel. In a two-dimensional image 710 in which the channels included in the similarity information 350 are arranged from left to right and from top to bottom in the order of channel numbers, the channels located in a first region 711 may be classified as a first group, the channels located in a second region 712 may be classified as a second group, the channels located in a third region 713 may be classified as a third group, and the channels located in a fourth region 714 may be classified as a fourth group. In embodiments, as discussed in greater detail below, the first group may correspond to first input information 721, the second group may correspond to second input information 722, the third group may correspond to third input information 723, and the fourth group may correspond to fourth input information 724.

When the similarity information 350 includes 169 channels, the first group may include 48 channels, the second group may include 40 channels, the third group may include 40 channels, and the fourth group may include 41 channels.

In FIG. 7, an example in which the similarity information 350 is divided into a plurality of groups according to the channel-wise intensity level has been illustrated and described; however, the disclosure is not limited thereto and the similarity information 350 may be divided into a plurality of groups according to different characteristic values for each channel.

Figure 8:
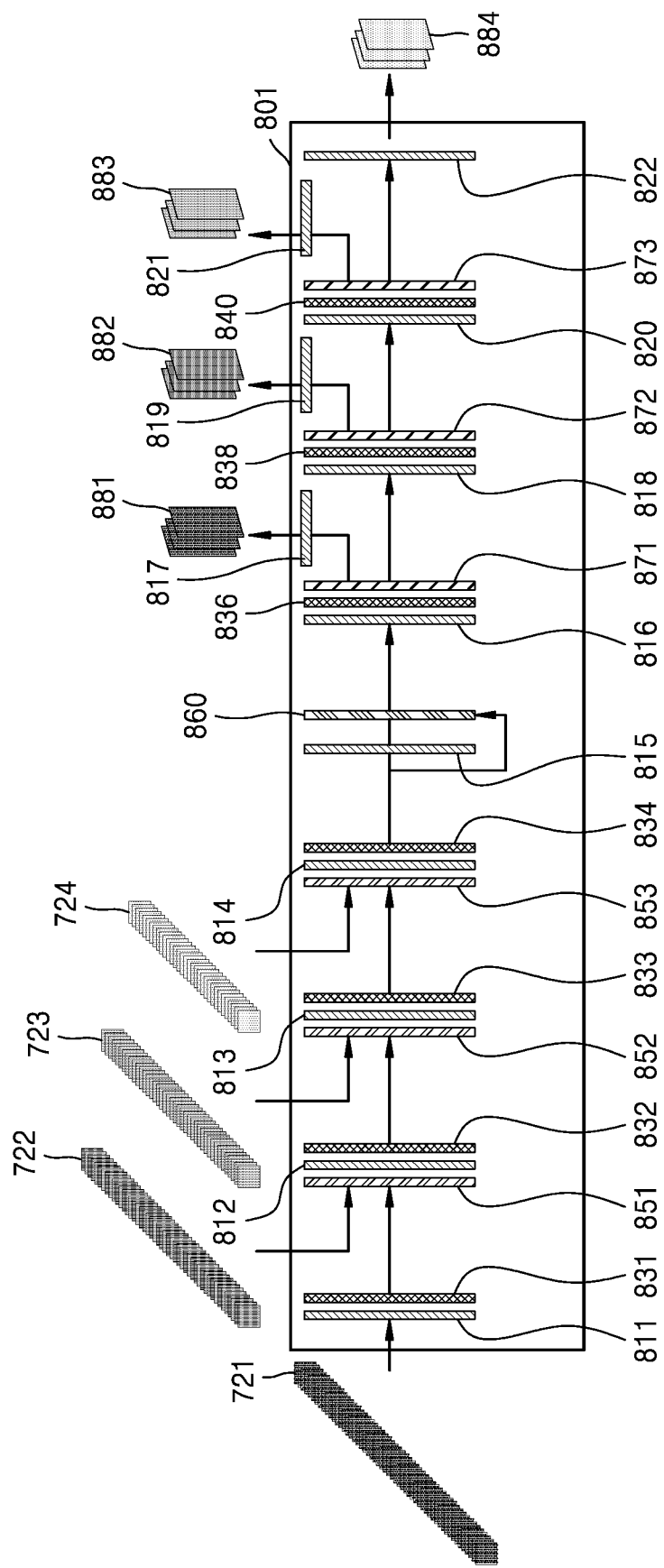
FIG. 8 is a diagram for describing a structure of a convolutional neural network according to an embodiment.

FIG. 8 is a diagram for describing a structure of a convolutional neural network according to an embodiment of the disclosure.

Referring to FIG. 8, a convolutional neural network 801 according to an embodiment of the disclosure may include one or more convolution layers, one or more activation layers, one or more concatenation layers, and one or more split layers. Also, the convolutional neural network 801 may further include an element-wise summation layer. In embodiments, the convolutional neural network 801 may correspond to convolutional neural network 610 described above.

In FIG. 8, for convenience of description, the convolutional neural network 610 according to an embodiment of the disclosure will be described as including 12 convolution layers.

Referring to FIG. 8, the first input information 721 may be input into a first convolution layer 811. The first input information 721 may include 48 channels, and in the first convolution layer 811, first feature information may be obtained by performing a convolution operation between the first input information 721 and a first kernel included in the first convolution layer 811. The first feature information may include 16 channels and may be input into a first activation layer 831. In the first activation layer 831, an operation of applying an activation function to the first feature information input into the first activation layer 831 may be performed. The value output from the first activation layer 831 may be input into a first concatenation layer 851, and the value output from the first activation layer 831 may include 16 channels.

Also, the second input information 722 may also be input into the first concatenation layer 851. The first concatenation layer 851 may concatenate the values input into the first concatenation layer 851 (which may be the value output from the first activation layer 831 and the second input information 722) in the channel direction and output the same to a second convolution layer 812. Accordingly, the value input into the second convolution layer 812 may include 56 (=40+16) channels.

In the second convolution layer 812, second feature information may be obtained by performing a convolution operation between the value input into the second convolution layer 812 and a second kernel included in the second convolution layer 812. The second feature information may include 20 channels and may be input into a second activation layer 832. In the second activation layer 832, an operation of applying an activation function to the second feature information input into the second activation layer 832 may be performed. The value output from the second activation layer 832 may be input into a second concatenation layer 852, and the value output from the second activation layer 832 may include 20 channels.

Also, the third input information 723 may also be input into the second concatenation layer 852. The second concatenation layer 852 may concatenate the values input into the second concatenation layer 852 (which may be the value output from the second activation layer 832 and the third input information 723) in the channel direction and output the same to a third convolution layer 813. Accordingly, the value input into the third convolution layer 813 may include 60 (=40+20) channels.

In the third convolution layer 813, third feature information may be obtained by performing a convolution operation between the value input into the third convolution layer 813 and a third kernel included in the third convolution layer 813. The third feature information may include 20 channels and may be input into a third activation layer 833. In the third activation layer 833, an operation of applying an activation function to the third feature information input into the third activation layer 833 may be performed. The value output from the third activation layer 833 may be input into a third concatenation layer 853, and the value output from the third activation layer 833 may include 20 channels.

Also, the fourth input information 724 may also be input into the third concatenation layer 853. The third concatenation layer 853 may concatenate the values input into the third concatenation layer 853 (which may be the value output from the third activation layer 833 and the fourth input information 724) in the channel direction and output the same to a fourth convolution layer 814. Accordingly, the value input into the fourth convolution layer 814 may include 61 (=41+20) channels. In the fourth convolution layer 814, fourth feature information may be obtained by performing a convolution operation between the value input into the fourth convolution layer 814 and a fourth kernel included in the fourth convolution layer 814. The fourth feature information may include 24 channels and may be input into a fourth activation layer 834. In the fourth activation layer 834, an operation of applying an activation function to the fourth feature information input into the fourth activation layer 834 may be performed. The value output from the fourth activation layer 834 may be input into a fifth convolution layer 815.

In the fifth convolution layer 815, fifth feature information may be obtained by performing a convolution operation between the value input into the fifth convolution layer 815 and a fifth kernel included in the fifth convolution layer 815. The fifth feature information may include 24 channels and may be input into an element-wise summation layer 860.

Also, the value output from the fourth activation layer 834 may also be input into the element-wise summation layer 860. The element-wise summation layer 860 may perform an operation of element-wise-summing the fifth feature information and the value output from the fourth activation layer 834.

The value output from the element-wise summation layer 860 may be input into a sixth convolution layer 816. Sixth feature information may be obtained by performing a convolution operation between the value input into the sixth convolution layer 816 and a sixth kernel included in the sixth convolution layer 816. The sixth feature information may include 32 channels. The sixth feature information may be input into a sixth activation layer 836. In the sixth activation layer 836, an operation of applying an activation function to the sixth feature information input into the sixth activation layer 836 may be performed. The value output from the sixth activation layer 836 may be input into a first split layer 871, and the value output from the sixth activation layer 836 may include 32 channels.

The first split layer 871 may divide 32 channels in half (which may mean to divide by 2, or to multiply by ½), to output 16 channels to a seventh convolution layer 817 and output the other 16 channels to an eighth convolution layer 818.

First output information 881 may be obtained by performing a convolution operation between the value input into the seventh convolution layer 817 and a seventh kernel included in the seventh convolution layer 817. The first output information 881 may include 48 channels, and the first output information 881 may correspond to the first input information 721.

Eighth feature information may be obtained by performing a convolution operation between the value input into the eighth convolution layer 818 and an eighth kernel included in the eighth convolution layer 818. The eighth feature information may include 28 channels. The eighth feature information may be input into an eighth activation layer 838. An operation of applying an activation function to the eighth feature information may be performed in the eighth activation layer 838. The value output from the eighth activation layer 838 may be input into a second split layer 872, and the value output from the eighth activation layer 838 may include 28 channels.

The second split layer 872 may divide 28 channels in in half to output 14 channels to a ninth convolution layer 819 and output the other 14 channels to a tenth convolution layer 820.

Second output information 882 may be obtained by performing a convolution operation between the value input into the ninth convolution layer 819 and a ninth kernel included in the ninth convolution layer 819. The second output information 882 may include 40 channels, and the second output information 882 may correspond to the second input information 722.

Also, tenth feature information may be obtained by performing a convolution operation between the value input into the tenth convolution layer 820 and a tenth kernel included in the tenth convolution layer 820. The tenth feature information may include 28 channels. The tenth feature information may be input into a tenth activation layer 840. An operation of applying an activation function to the tenth feature information may be performed in the tenth activation layer 840. The value output from the tenth activation layer 840 may be input into a third split layer 873, and the value output from the tenth activation layer 840 may include 28 channels.

The third split layer 873 may divide 28 channels in half to output 14 channels to an eleventh convolution layer 821 and output the other 14 channels to a twelfth convolution layer 822.

Third output information 883 may be obtained by performing a convolution operation between the value input into the eleventh convolution layer 821 and an eleventh kernel included in the eleventh convolution layer 821. The third output information 883 may include 40 channels, and the third output information 883 may correspond to the third input information 723.

Also, fourth output information 884 may be obtained by performing a convolution operation between the value input into the twelfth convolution layer 822 and a twelfth kernel included in the twelfth convolution layer 822. The fourth output information 884 may include 41 channels, and the fourth output information 884 may correspond to the fourth input information 724.

Moreover, the attention map generator 220 according to an embodiment of the disclosure may generate an attention map 650 based on the first to fourth output information 881, 882, 883, and 884.

An example of this will be described in detail with reference to FIG. 9.

Figure 9:
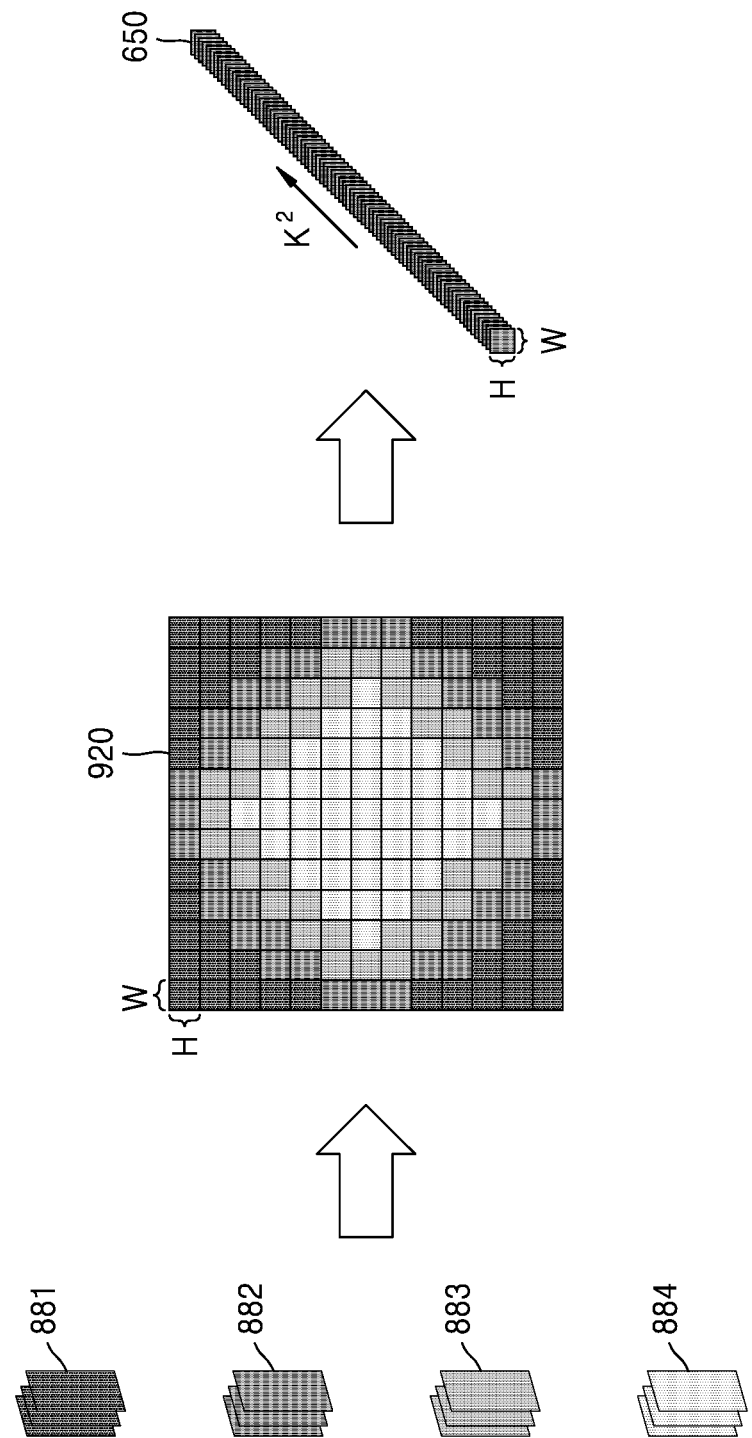
FIG. 9 is a diagram for describing an operation of generating an attention map, according to an embodiment.

FIG. 9 is a diagram for describing an operation of generating an attention map, according to an embodiment of the disclosure.

Referring to FIG. 9, based on the order of the channels included in the first output information 881 and the order of the channels included in the first input information 721, the attention map generator 220 may assign the same channel number (which may be an index) to the channels included in the first output information 881 as to the channels included in the first input information 721. For example, when the channel number of the first channel included in the first input information 721 is '0', the attention map generator 220 may assign the channel number '0' to the first channel included in the first output information 881.

Also, the channel number may be assigned to the second to fourth output information 882, 883, and 884 in the same way. For example, when the channel number of the first channel included in the second input information 722 is '5', the channel number '5' may be assigned to the first channel included in the second output information 882.

A two-dimensional image 920 of FIG. 9 may represent an image in which the channels included in the first to fourth output information 881, 882, 883, and 884 are arranged from left to right and from top to bottom in the order of channel numbers.

When a channel number is assigned to the first to fourth output information 881, 882, 883, and 884, the attention map generator 220 may generate an attention map 650 by arranging the channels included in the first to fourth output information 881, 882, 883, and 884 in the order of channel numbers and then integrating the first to fourth output information 881, 882, 883, and 884.

Figure 10A:
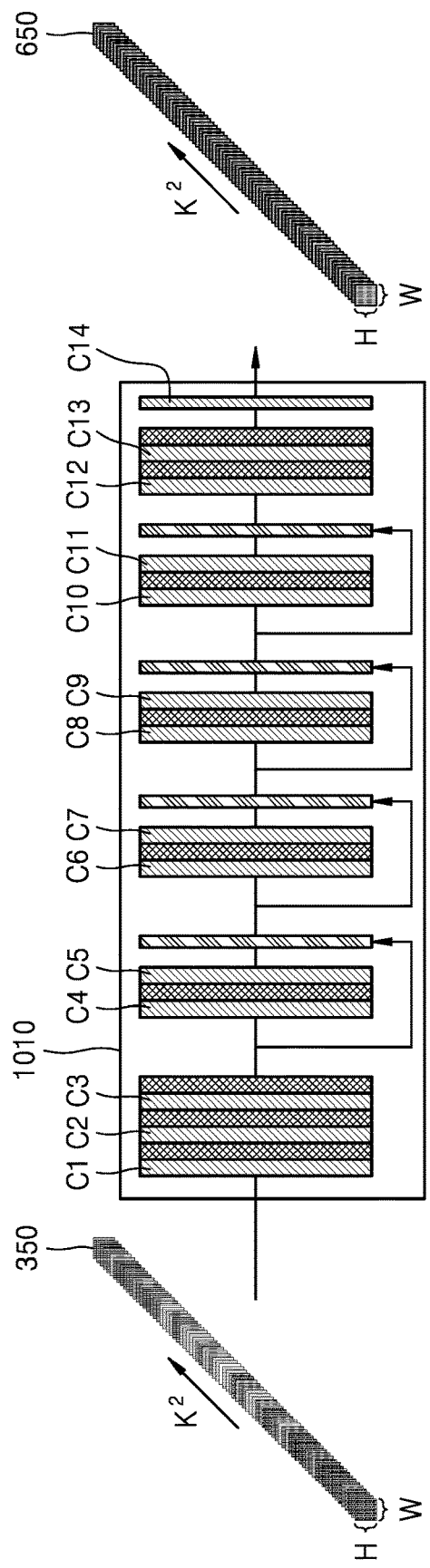
FIGS. 10A and 10B are diagrams for comparing a method of generating an attention map by using a first convolutional neural network and a method of generating an attention map by using a second convolutional neural network, according to an embodiment.
Figure 10B:
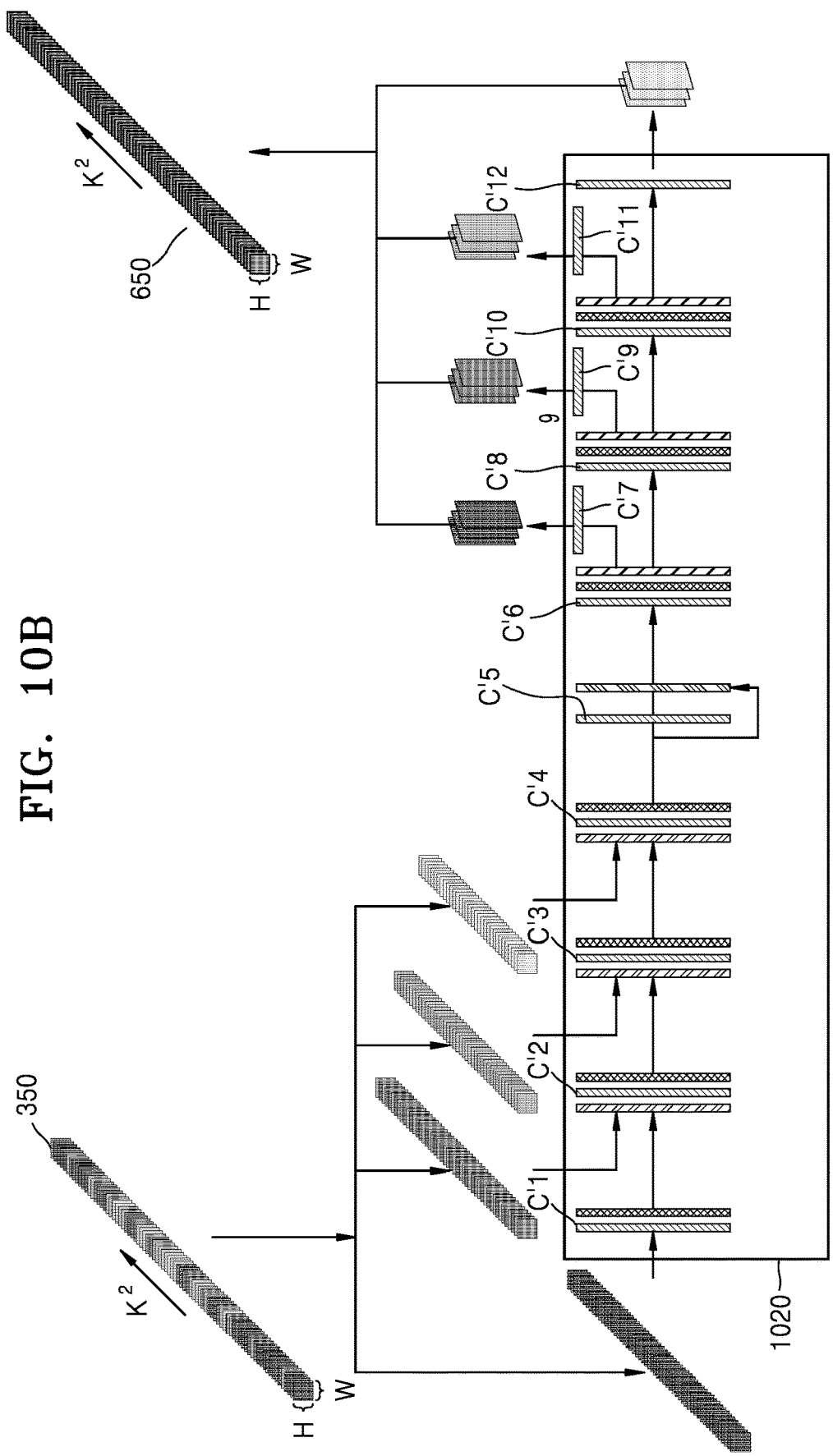

FIGS. 10A and 10B are diagrams for comparing a method of generating an attention map by using a first convolutional neural network and a method of generating an attention map by using a second convolutional neural network, according to an embodiment of the disclosure.

Referring to FIG. 10A, a first convolutional neural network 1010 may include 14 convolution layers, 9 activation layers, and 4 element-wise summation layers. In this case, an attention map 650 may be generated by inputting the similarity information 350 including 169 channels into the first convolutional neural network 1010 and performing a convolution operation in each of the 14 convolution layers, an activation operation in each of the 9 activation layers, and an element-wise summation operation in each of the 4 element-wise summation layers in the first convolutional neural network 1010.

When the similarity information 350 including 169 channels is image-processed by using the first convolutional neural network 1010, the number of channels of the input information of a first convolution layer C1 may be 169 and the number of channels of the output information thereof may be 134. Also, the number of channels of the input information of a second convolution layer C2 may be 134, and the number of channels of the output information thereof may be 99. Also, the number of channels of the input information of a third convolution layer C3 may be 99, and the number of channels of the output information thereof may be 64. Also, the number of channels of the input information of fourth to eleventh convolution layers C4, C5, C6, C7, C8, C9, C10, and C11 may be 64, and the number of channels of the output information thereof may be 64. Also, the number of channels of the input information of a twelfth convolution layer C12 may be 64, and the number of channels of the output information thereof may be 99. The number of channels of the input information of a thirteenth convolution layer C13 may be 99, and the number of channels of the output information thereof may be 134. Also, the number of channels of the input information of a fourteenth convolution layer C14 may be 134, and the number of channels of the output information thereof may be 169.

Moreover, referring to FIG. 10B, a second convolutional neural network 1020 may be the convolutional neural network 610 illustrated and described in FIG. 8.

When the similarity information 350 including 169 channels is image-processed by using the second convolutional neural network 1020, the number of channels of the input information of a first convolution layer C'1 may be 48 and the number of channels of the output information thereof may be 16. Also, the number of channels of the input information of a second convolution layer C'2 may be 56, and the number of channels of the output information thereof may be 20. Also, the number of channels of the input information of a third convolution layer C'3 may be 60, and the number of channels of the output information thereof may be 20. Also, the number of channels of the input information of a fourth convolution layer C'4 may be 61 and the number of channels of the output information thereof may be 24, and the number of channels of the input information of a fifth convolution layer C'5 may be 24 and the number of channels of the output information thereof may be 24. The number of channels of the input information of a sixth convolution layer C'6 may be 24, and the number of channels of the output information thereof may be 32. Also, the number of channels of the input information of a seventh convolution layer C'7 may be 16, and the number of channels of the output information thereof may be 48. Also, the number of channels of the input information of an eighth convolution layer C'8 may be 16, and the number of channels of the output information thereof may be 28. The number of channels of the input information of a ninth convolution layer C'9 may be 14, and the number of channels of the output information thereof may be 40. The number of channels of the input information of a tenth convolution layer C'10 may be 14, and the number of channels of the output information thereof may be 28. The number of channels of the input information of an eleventh convolution layer C'11 may be 14, and the number of channels of the output information thereof may be 40. The number of channels of the input information of a twelfth convolution layer C'12 may be 14, and the number of channels of the output information thereof may be 41.

Moreover, when the size of the input information of the convolution layer is W×H, the number of channels is Ci, the size of the kernel included in the convolution layer is K×K, and the size of the output information of the convolution layer is W×H, and the number of channels is Co, the number of operations of the convolution operation performed in the convolution layer may be expressed as Equation 1 below.

$$\text{Number of operations} = W \times H \times K^2 \times Ci \times Co \qquad \text{[Equation 1]}$$

Accordingly, when the size of the similarity information 350 is 128×128 and the size of the kernel included in each of the first to fourteenth convolution layers C1, C2, . . . , C14 included in the first convolutional neural network 1010 is 3×3, the number of operations of the entire convolution operation performed in the first convolutional neural network 1010 may be 17,291,280,384 as illustrated in FIG. 10A. This may be referred to as a first number of operations.

Also, the size of the kernel included in each of the first to twelfth convolution layers C'1, C'2, C'12 included in the second convolutional neural network 1020 is 3×3, the number of operations of the entire convolution operation performed in the second convolutional neural network 1020 may be 1,356,300,288 as illustrated in FIG. 10B. This may be referred to as a second number of operations.

The second number of operations of the entire convolution operation performed in the second convolutional neural network 1020 may be 1/12.75 times the first number of operations of the entire convolution operation performed in the first convolutional neural network 1010.

Moreover, in order to reduce the operation amount of the convolution operation, when the convolution operation is performed by being divided into depth-wise convolution and point-wise convolution, the number of operations of the entire convolution operation may be expressed as Equation 2 below.

$$\text{Number of operations} = W \times H \times (K^2 \times Ci) + W \times H \times 1^2 \times Ci \times Co = W \times H \times Ci \times (K^2 + Co) \qquad \text{[Equation 2]}$$

Thus, when the convolution operation of the first convolutional neural network 1010 is lightened, the number of operations of the entire convolution operation may be 2,099,822,592 as illustrated in FIG. 10A. This may be referred to as a third number of operations.

Accordingly, even when the convolution operation performed in the first convolutional neural network 1010 is lightened, the second number of operations of the second convolutional neural network 1020 that is not lightened may be smaller.

Thus, when the attention map is generated by using the second convolutional neural network by dividing the similarity information into a plurality of groups and inputting a plurality of divided groups into different layers, the operation amount may be reduced while similarly maintaining the image processing performance as in the case of generating the attention map by using the first convolutional neural network.

Figure 11:
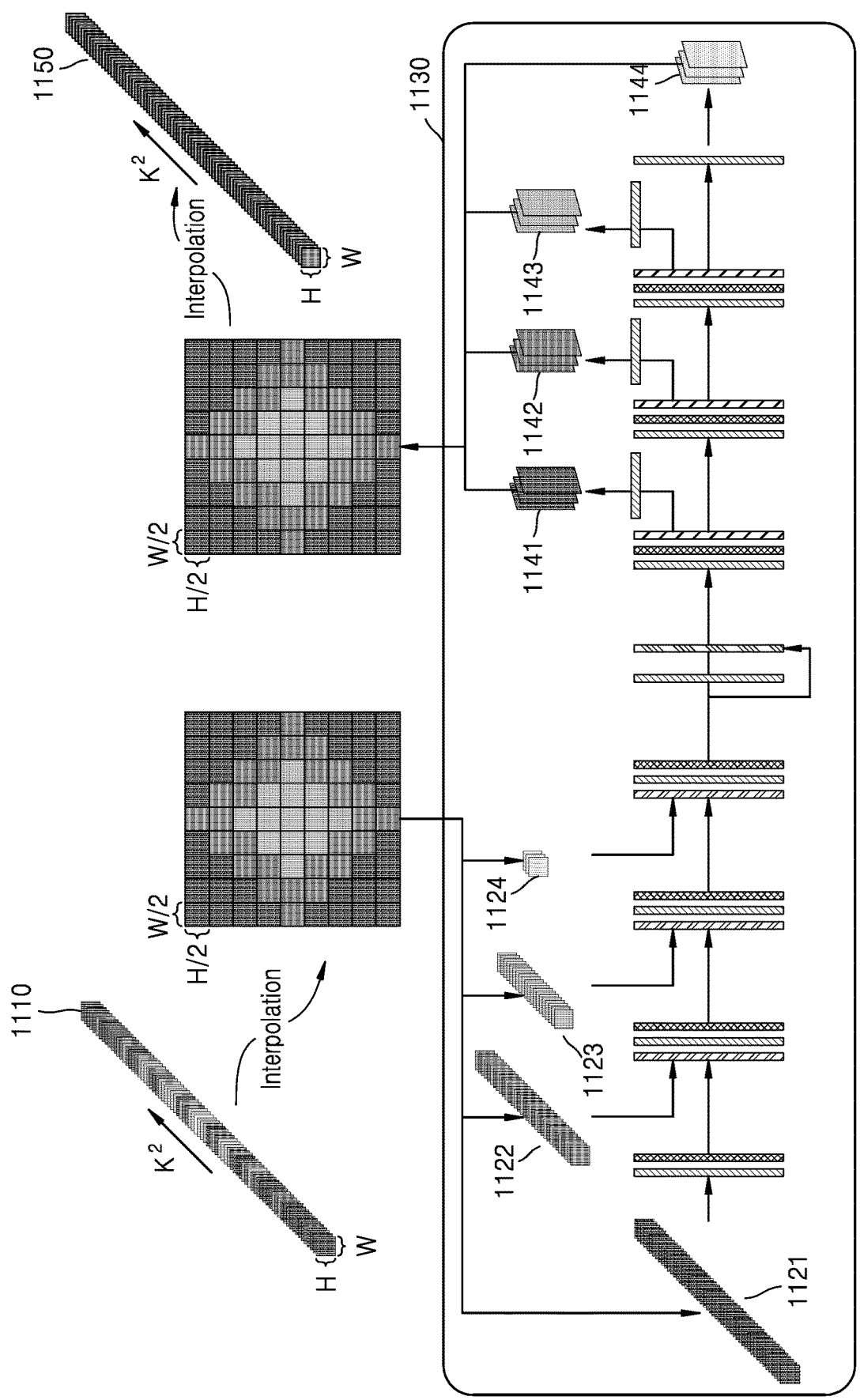
FIG. 11 is a diagram for describing an operation of generating an attention map, according to another embodiment.

FIG. 11 is a diagram for describing an operation of generating an attention map, according to another embodiment of the disclosure.

According to an embodiment of the disclosure, the attention map generator 220 may downscale similarity information 1110. For example, when the size of the similarity information 1110 is downscaled to 50% or to ½, the size of the downscaled similarity information may be W/2×H/2 and the number of channels may be $K^2$. In this case, the attention map generator 220 may downscale the similarity information 1110 by using a bilinear interpolation method, a bicubic interpolation method, a nearest neighbor interpolation method, or the like. However, the disclosure is not limited thereto.

Also, the similarity information 1110 of FIG. 11 may include 81 channels and may be divided into a plurality of groups according to the channel-wise characteristic value included in the downscaled similarity information. For example, the similarity information 1110 may be divided into first to fourth groups according to the intensity level of each of the channels included in the downscaled similarity information. In this case, 40 channels may be included in the first group, which may be referred to as first input information 1121, 28 channels may be included in the second group, which may be referred to as second input information 1122, 12 channels may be included in the third group, which may be referred to as third input information 1123, and 1 channel may be included in the fourth group, which may be referred to as fourth input information 1124.

According to an embodiment of the disclosure, the attention map generator 220 may obtain first to fourth output information 1141, 1142, 1143, and 1144 by processing the first to fourth input information 1121, 1122, 1123, and 1124 by using a convolutional neural network 1130. Because the convolutional neural network 1130 has the same structure as the convolutional neural network 610 of FIG. 8 and the structure and operation of the convolutional neural network 610 have been described in detail with reference to FIG. 8, redundant descriptions of the structure and operation of the convolutional neural network 1130 will be omitted for conciseness.

Also, the attention map generator 220 may generate an attention map 1050 based on the first to fourth output information 1141, 1142, 1143, and 1144. Because an operation of the attention map generator 220 for generating an attention map based on a plurality of pieces of output information has been described in detail with reference to FIG. 9, redundant descriptions thereof will be omitted for conciseness.

As illustrated and described in FIG. 11, when an attention map 1150 is generated by downscaling the similarity information 1110, the number of channels of the input information and the number of channels of the output information may be reduced in each of the convolution layers included in the convolutional neural network 1130 and thus the number of operations of the entire convolution operation may be reduced. Thus, when the similarity information 1110 is downscaled, the attention map 1150 may be generated with a smaller number of operations while similarly maintaining the feature of the similarity information 1110.

Figure 12:
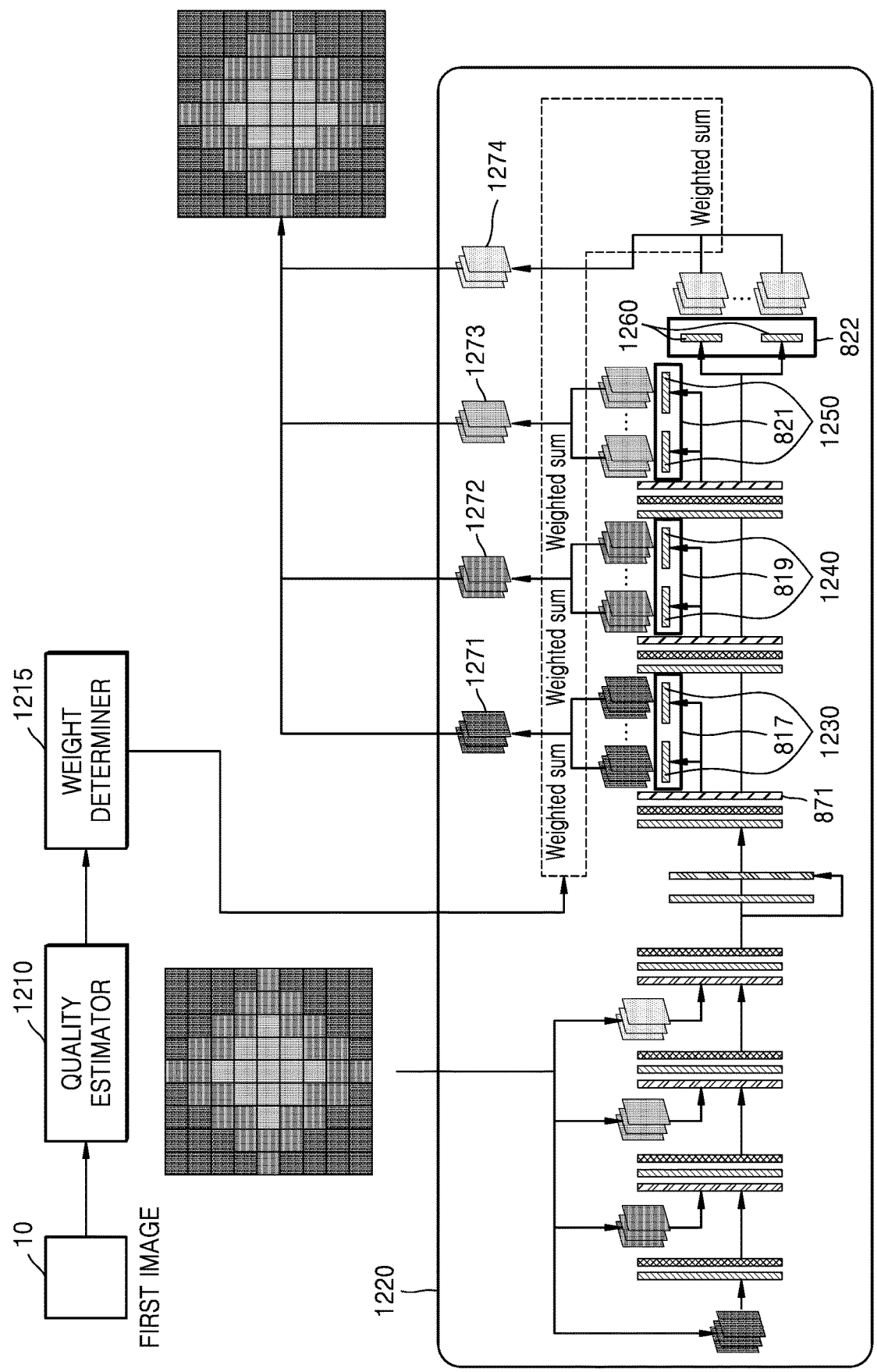
FIG. 12 is a diagram for describing an operation of generating an attention map, according to another embodiment.

FIG. 12 is a diagram for describing an operation of generating an attention map, according to another embodiment of the disclosure.

Referring to FIG. 12, the image processing apparatus 100 according to an embodiment of the disclosure may further include a quality estimator 1210 for obtaining quality information of the first image 101.

According to an embodiment of the disclosure, the quality estimator 1210 may obtain quality information corresponding to the first image 101 or each of a plurality of regions included in the first image 101. The quality estimator 1210 may estimate the quality of the entire first image 101 or each region based on texture, edge, and/or noise information included in each of the plurality of regions included in the first image 101. In this case, the quality estimator 1210 may obtain quality information for the entire first image or for each region based on a pre-trained quality estimation network. For example, the quality estimation network may be a network for receiving an entire image or a region of an image and outputting a quality value of the image or region; however, the disclosure is not limited thereto. Also, the quality estimator 1210 may obtain quality information for each pixel included in the first image 101.

According to an embodiment of the disclosure, a convolutional neural network 1220 may have a structure similar to the convolutional neural network 801 described above with respect to FIG. 8, and in addition each of the seventh convolution layer 817, the ninth convolution layer 819, the eleventh convolution layer 821, and the twelfth convolution layer 822 includes a plurality of convolution layers.

For example, the seventh convolution layer 817 may include a structure in which N convolution layers ((7-1)th to (7-N)th convolution layers 1230) are connected in parallel. The values output from the first split layer 871 may be input into each of the (7-1)th to (7-N)th convolution layers 1230. In this case, the output values output from the N convolution layers may correspond to N pieces of preset quality information. For example, the value output from the (7-1)th convolution layer may be an output value corresponding to first quality information, and the value output from the (7-N)th convolution layer may be an output value corresponding to N-th quality information.

According to an embodiment of the disclosure, a weight determiner 1215 may determine the weights of the values output from each of the N convolution layers according to the pixel-wise quality information (the quality information for each of the pixels) obtained by the quality estimator 1210.

The attention map generator 220 may obtain a weighted sum of the values output from each of the (7-1)th to (7-N)th convolution layers as first output information 1271, based on the determined weights. In the same way, a weighted sum of the values output from each of (9-1)th to (9-N)th convolution layers 1240 may be obtained as second output information 1272.

Also, a weighted sum of the values output from each of (11-1)th to (11-N)th convolution layers 1250 may be obtained as third output information 1273, and a weighted sum of the values output from each of (12-1)th to (12-N)th convolution layers 1260 may be obtained as fourth output information 1274.

The attention map generator 220 may generate an attention map based on the first to fourth output information 1271, 1272, 1273, and 1274. Because an operation of generating an attention map based on a plurality of pieces of output information has been described in detail with reference to FIG. 9, redundant descriptions thereof will be omitted for conciseness.

Referring back to FIG. 2, the spatially variant kernel generator 230 according to an embodiment of the disclosure may generate a spatially variant kernel based on the spatial kernel and the attention map generated by the attention map generator 220. In this case, the spatial kernel may represent weight information according to the position relationship between each of the pixels included in the first image 101 and a neighboring pixel. A method of generating the spatially variant kernel will be described in detail with reference to FIG. 13.

FIG. 13 is a diagram referenced to describe a method of generating a spatially variant kernel, according to an embodiment of the disclosure.

Referring to FIG. 13, the spatially variant kernel generator 230 may generate a spatially variant kernel 1350 by using a spatial kernel 1310 and an attention map 650. For example, the spatially variant kernel generator 230 may convert the spatial kernel 1310 into a one-dimensional vector 1320. The spatial kernel 1310 may have a size of K×K, and as for the pixel values included in the spatial kernel 1310, the center pixel value may be greatest and the pixel value may decrease away from the center pixel. The spatially variant kernel generator 230 may arrange the pixel values included in the spatial kernel 1310 in the channel direction and convert the spatial kernel 1310 into a weight vector 1320 having a size of $1 \times 1 \times K^2$.

Moreover, the size of the attention map 650 generated by the attention map generator 220 may be W×H and the number of channels thereof may be $K^2$.

The spatially variant kernel generator 230 may generate the spatially variant kernel 1350 by multiplying the attention map 650 and the weight vector 1320. In this case, the spatially variant kernel generator 230 may generate the spatially variant kernel 1350 by performing element-wise multiplication between each of the one-dimensional vectors having a size of $1 \times 1 \times K^2$ included in the attention map 650 and the weight vector 1320 having a size of $1 \times 1 \times K^2$.

As illustrated in FIG. 13, a second vector 1351 may be generated by performing an element-wise multiplication operation between the weight vector 1320 and a first vector 651 included in the attention map 650. In this case, the position of the first vector 651 in the attention map 650 and the position of the second vector 1351 in the spatially variant kernel 1350 may correspond to each other.

According to an embodiment of the disclosure, like the attention map 650, the spatially variant kernel 1350 may have a size of W×H and may include $K^2$ channels.

Referring back to FIG. 2, the spatially variant kernel generator 230 may output the generated spatially variant kernel 1350 to the filter 240, and the filter 240 may generate the second image 102 by receiving the first image 101 and applying the spatially variant kernel 1350 to the first image 101. A method of generating the second image 102 by applying the spatially variant kernel 1350 to the first image 101 will be described in detail with reference to FIG. 14.

Figure 14:
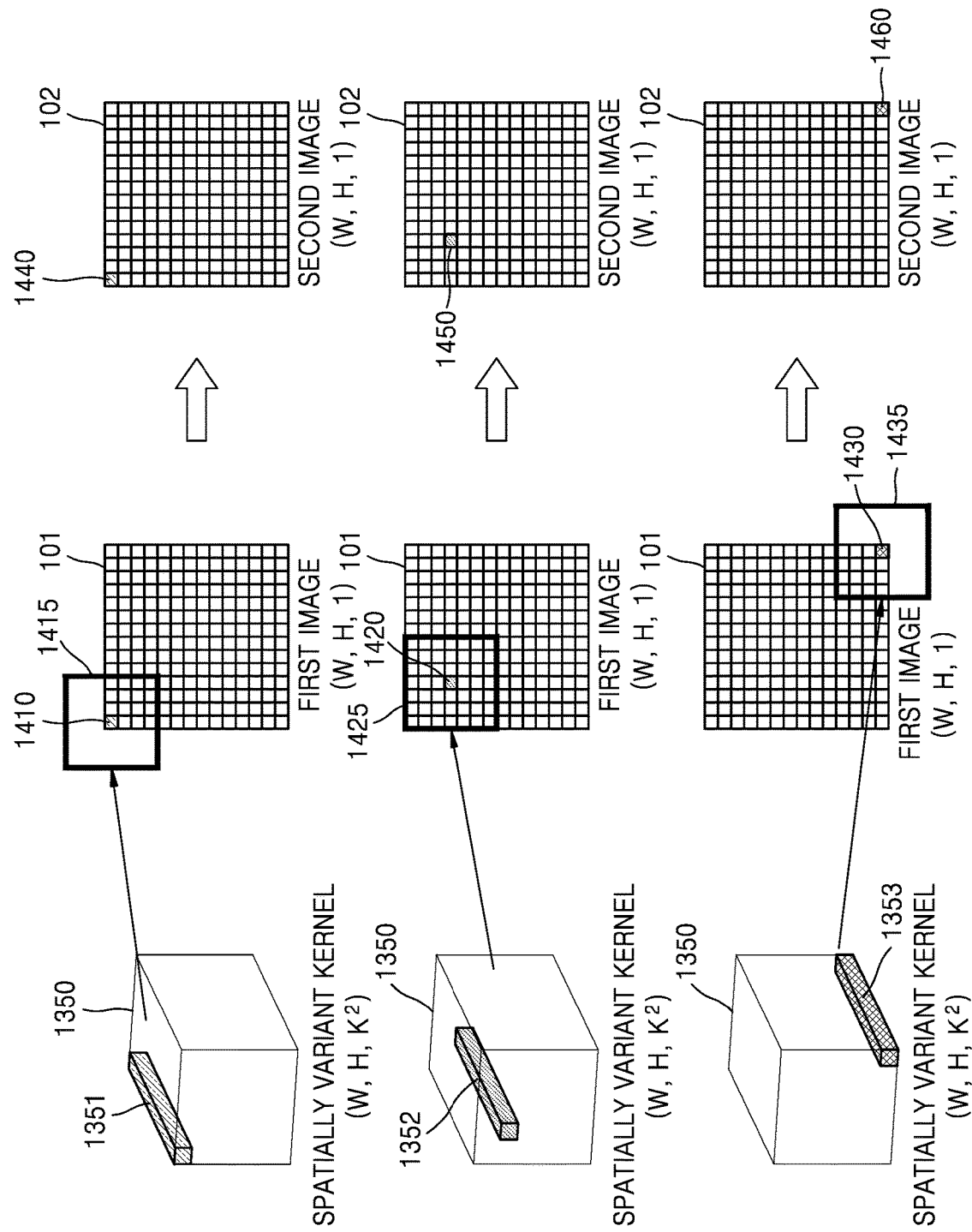
FIG. 14 is a diagram referenced to describe a method of applying a spatially variant kernel to a first image, according to an embodiment.

FIG. 14 is a diagram referenced to describe a method of applying a spatially variant kernel to a first image, according to an embodiment of the disclosure.

Referring to FIG. 14, the spatially variant kernel 1350 according to an embodiment of the disclosure may include a kernel vector corresponding to each of the pixels included in the first image. For example, the spatially variant kernel 1350 may include a first kernel vector 1351 corresponding to a first pixel 1410 included in the first image 101 and may include a second kernel vector 1352 corresponding to a second pixel 1420 included in the first image 101. Also, the spatially variant kernel 1350 may include a third kernel vector 1353 corresponding to a third pixel 1430 included in the first image 101.

The filter 240 may convert a one-dimensional kernel vector having a size of $1 \times 1 \times K^2$ into a two-dimensional kernel having a size of K×K. For example, the first kernel vector 1351 may be converted into a first kernel 1415, the second kernel vector 1352 may be converted into a second kernel 1425, and the third kernel vector 1353 may be converted into a third kernel 1435.

The filter 240 may calculate a value of a fourth pixel 1440 of the second image 102 by performing filtering by applying the first kernel 1415 to a first region centered on the first pixel 1410 included in the first image 101. Also, the filter 240 may calculate a value of a fifth pixel 1450 of the second image 102 by performing filtering by applying the second kernel 1425 to a second region centered on the second pixel 1420 included in the first image 101. Also, the filter 240 may calculate a value of a sixth pixel 1460 of the second image 102 by performing filtering by applying the third kernel 1435 to a third region centered on the third pixel 1430 included in the first image 101.

In the same way, the filter 240 may calculate the pixel values included in the second image 102 by applying a kernel corresponding to each of the pixels included in the first image 101 to a region centered on each of the pixels included in the first image 101.

Figure 15:
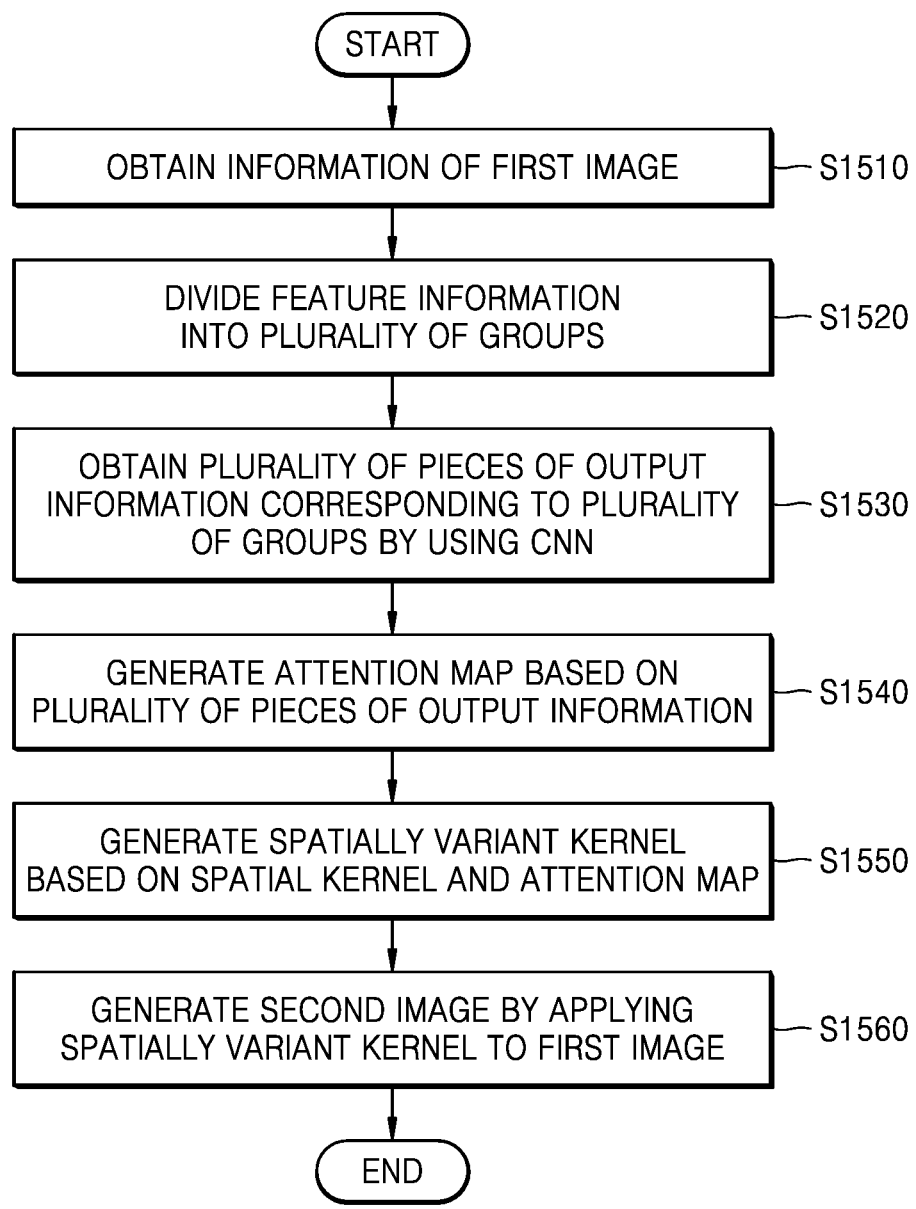
FIG. 15 is a flowchart illustrating an operating method of an image processing apparatus according to an embodiment.

FIG. 15 is a flowchart illustrating an operating method of an image processing apparatus according to an embodiment of the disclosure.

Referring to FIG. 15, the image processing apparatus 100 according to an embodiment of the disclosure may obtain characteristic information of a first image at operation S1510.

For example, the characteristic information of the first image may include similarity information, frequency characteristic information, gradient characteristic information, region characteristic information, and/or the like. The similarity information may be information representing the similarity between each of the pixels included in the first image and a neighboring pixel. Because a method of generating the similarity information has been described in detail with reference to FIGS. 3, 4A, and 4B, redundant descriptions thereof will be omitted for conciseness.

Also, the image processing apparatus 100 may obtain frequency characteristic information by performing filtering based on a Gaussian kernel or discrete cosine transform or wavelet transform or the like on the first image. An example of this has already been described in detail with reference to FIG. 5, and thus, redundant descriptions thereof will be omitted for conciseness.

According to an embodiment of the disclosure, the image processing apparatus 100 may divide the characteristic information into a plurality of groups at operation S1520.

For example, when the characteristic information includes a plurality of channels, the image processing apparatus 100 may divide the characteristic information into a plurality of groups according to the channel-wise characteristic value. When the characteristic information is similarity information, the channels may be divided into a plurality of groups according to the strength of each of the channels included in the similarity information. This has already been described in detail with reference to FIG. 7, and thus, redundant descriptions thereof will be omitted for conciseness.

According to an embodiment of the disclosure, the image processing apparatus 100 may obtain a plurality of pieces of output information corresponding to the plurality of groups by using a convolutional neural network at operation S1530.

For example, the image processing apparatus 100 may respectively input the plurality of groups divided in operation S1520 to different layers included in the convolutional neural network. First input information corresponding to a first group may be input into a first convolution layer, and second input information corresponding to a second group may be input into a second convolution layer. In this case, the second convolution layer may be a layer located after the first convolution layer in the convolutional neural network. A convolution operation with one or more kernels may be performed on the input information. The image processing apparatus 100 may obtain a plurality of pieces of output information corresponding to the plurality of groups from different layers included in the convolutional neural network. For example, first output information corresponding to the first input information may be output from a third convolution layer, and second output information corresponding to the second input information may be output from a fourth convolution layer. In this case, the fourth convolution layer may be a layer located after the third convolution layer in the convolutional neural network.

According to an embodiment of the disclosure, the image processing apparatus 100 may generate an attention map based on the plurality of pieces of output information at operation S1540.

For example, the image processing apparatus 100 may determine the order of the channels of the output information based on the order of the channels of the input information. The image processing apparatus 100 may generate an attention map by integrating the plurality of pieces of output information in the channel direction according to the order of the channels. An example of this has already been described in detail with reference to FIG. 9, and thus, redundant descriptions thereof will be omitted for conciseness.

According to an embodiment of the disclosure, the image processing apparatus 100 may generate a spatially variant kernel based on the spatial kernel and the attention map at operation S1550.

For example, the image processing apparatus 100 may convert the spatial kernel into a one-dimensional vector. The spatial kernel may have a size of K×K, and as for the pixel values included in the spatial kernel, the center pixel value may be greatest and the pixel value may decrease away from the center pixel. The image processing apparatus 100 may arrange the pixel values included in the spatial kernel in the channel direction and convert the spatial kernel into a weight vector having a size of $1 \times 1 \times K^2$.

The size of the attention map generated in operation S1530 may be W×H, and the number of channels thereof may be $K^2$.

The image processing apparatus 100 may generate a spatially variant kernel by multiplying the attention map and the weight vector. In this case, the image processing apparatus 100 may generate a spatially variant kernel by performing element-wise multiplication between each of the one-dimensional vectors having a size of $1 \times 1 \times K^2$ included in the attention map and a weight vector having a size of $1 \times 1 \times K^2$.

A method of generating the spatially variant kernel has already been described in detail with reference to FIG. 13, and thus, redundant descriptions thereof will be omitted for conciseness.

According to an embodiment of the disclosure, the image processing apparatus 100 may generate a second image by applying the spatially variant kernel to the first image at operation S1560.

The spatially variant kernel generated in operation S1550 may include a kernel vector corresponding to each of the pixels included in the first image. For example, the spatially variant kernel may include a first kernel vector corresponding to a first pixel included in the first image and may include a second kernel vector corresponding to a second pixel included in the first image.

The image processing apparatus 100 may convert a one-dimensional kernel vector having a size of $1 \times 1 \times K^2$ into a two-dimensional kernel having a size of K×K. For example, the first kernel vector may be converted into a two-dimensional first kernel, and the second kernel vector may be converted into a two-dimensional second kernel.

The image processing apparatus 100 may calculate a third pixel value included in the second image by performing filtering by applying the first kernel to a region centered on the first pixel and may calculate a fourth pixel value included in the second image by performing filtering by applying the second kernel to a region centered on the second pixel.

Accordingly, when filtering the first image, the image processing apparatus 100 may perform the filtering by applying different kernels according to the position of the center pixel.

Figure 16:
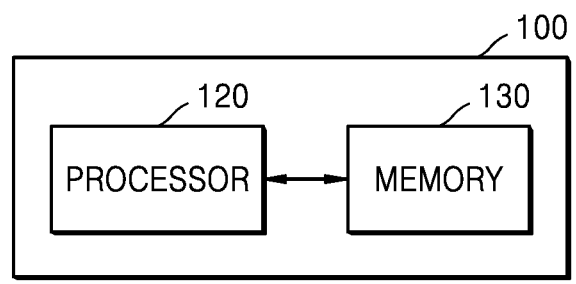
FIG. 16 is a block diagram illustrating a configuration of an image processing apparatus according to an embodiment.

FIG. 16 is a block diagram illustrating a configuration of an image processing apparatus according to an embodiment of the disclosure.

Referring to FIG. 16, the image processing apparatus 100 according to an embodiment of the disclosure may include a processor 120 and a memory 130.

According to an embodiment of the disclosure, the processor 120 may overall control the image processing apparatus 100. According to an embodiment of the disclosure, the processor 120 may execute one or more programs stored in the memory 130.

According to an embodiment of the disclosure, the memory 130 may store various data, programs, or applications for driving and controlling the image processing apparatus 100. The program stored in the memory 130 may include one or more instructions. The application or program (one or more instructions) stored in the memory 130 may be executed by the processor 120.

According to an embodiment of the disclosure, the processor 120 may include at least one of a central processing unit (CPU), a graphic processing unit (GPU), or a video processing unit (VPU). Alternatively, according to an embodiment of the disclosure, the processor 120 may be implemented in the form of a system-on-chip (SoC) in which at least one of a CPU, a GPU, or a VPU is integrated. Alternatively, the processor 120 may further include a neural processing unit (NPU).

According to an embodiment of the disclosure, the processor 120 may use the image processing network 103 to generate an output image that has undergone denoising for maintaining the texture and fine edge processing while removing noise from an input image. For example, the processor 120 may perform at least one of the operations of the characteristic information generator 210, the attention map generator 220, the spatially variant kernel generator 230, and the filter 240 illustrated and described with reference to FIGS. 2 to 14.

The processor 120 may obtain characteristic information of a first image. For example, the characteristic information of the first image may include similarity information, frequency characteristic information, gradient characteristic information, region characteristic information, and/or the like. Because a method of generating the similarity information has already been described in detail with reference to FIGS. 3, 4A, and 4B and a method of obtaining the frequency characteristic information has already been described in detail with reference to FIG. 5, redundant descriptions thereof will be omitted for conciseness.

The processor 120 may divide the characteristic information into a plurality of groups. For example, when the characteristic information includes a plurality of channels, the processor 120 may divide the characteristic information into a plurality of groups according to the channel-wise characteristic value. When the characteristic information is similarity information, the channels may be divided into a plurality of groups according to the strength of each of the channels included in the similarity information. An example of this has already been described in detail with reference to FIG. 7, and thus, redundant descriptions thereof will be omitted for conciseness.

The processor 120 may obtain a plurality of pieces of output information corresponding to the plurality of groups by using a convolutional neural network. For example, the processor 120 may respectively input a plurality of divided groups into different layers included in the convolutional neural network. First input information corresponding to a first group may be input into a first convolution layer, and second input information corresponding to a second group may be input into a second convolution layer. In this case, the second convolution layer may be a layer located after the first convolution layer in the convolutional neural network. A convolution operation with one or more kernels may be performed on the input information. The processor 120 may obtain a plurality of pieces of output information corresponding to the plurality of groups from different layers included in the convolutional neural network. For example, first output information corresponding to the first input information may be output from a third convolution layer, and second output information corresponding to the second input information may be output from a fourth convolution layer. In this case, the fourth convolution layer may be a layer located after the third convolution layer in the convolutional neural network.

The processor 120 may generate an attention map based on the plurality of pieces of output information. For example, the processor 120 may determine the order of the channels of the output information based on the order of the channels of the input information. The processor 120 may generate an attention map by integrating the plurality of pieces of output information in the channel direction according to the order of the channels. An example of this has already been described in detail with reference to FIG. 9, and thus, redundant descriptions thereof will be omitted for conciseness.

Also, the processor 120 may generate a spatially variant kernel based on the spatial kernel and the attention map. For example, the processor 120 may convert the spatial kernel into a one-dimensional vector. The spatial kernel may have a size of K×K, and as for the pixel values included in the spatial kernel, the center pixel value may be greatest and the pixel value may decrease away from the center pixel. The processor 120 may arrange the pixel values included in the spatial kernel in the channel direction and convert the spatial kernel into a weight vector having a size of $1 \times 3 \times K^2$. According to an embodiment of the disclosure, the size of the attention map may be W×H, the number of channels thereof may be $K^2$, and the processor 120 may generate a spatially variant kernel by multiplying the attention map and the weight vector. In this case, the processor 120 may generate a spatially variant kernel by performing element-wise multiplication between each of the one-dimensional vectors having a size of $1 \times 1 \times K^2$ included in the attention map and a weight vector having a size of $1 \times 1 \times K^2$.

The processor 120 may generate a second image by applying the spatially variant kernel to the first image. The spatially variant kernel may include a kernel vector corresponding to each of the pixels included in the first image. For example, the spatially variant kernel may include a first kernel vector corresponding to a first pixel included in the first image and may include a second kernel vector corresponding to a second pixel included in the first image.

The processor 120 may convert a one-dimensional kernel vector having a size of $1 \times 1 \times K^2$ into a two-dimensional kernel having a size of K×K. For example, the first kernel vector may be converted into a two-dimensional first kernel, and the second kernel vector may be converted into a two-dimensional second kernel. The processor 120 may calculate a third pixel value included in the second image by performing filtering by applying the first kernel to a region centered on the first pixel and may calculate a fourth pixel value included in the second image by performing filtering by applying the second kernel to a region centered on the second pixel.

Moreover, the image processing network 103 according to an embodiment of the disclosure may be a network trained by a server or an external device. The external device may train the image processing network 103 based on training data. In this case, the training data may include a plurality of data sets including image data including noise and image data in which an edge feature or a texture feature is preserved while noise is removed.

The server or the external device may determine parameter values included in the kernels used in each of a plurality of convolution layers included in the image processing network 103. For example, the server or the external device may determine the parameter values in the direction of minimizing the difference (for example loss information) in the image data (for example training data) in which the edge feature is preserved while the noise and the image data generated by the image processing network 103 are removed.

According to an embodiment of the disclosure, the image processing apparatus 100 may receive the trained image processing network 103 from the server or the external device and store the same in the memory 130. For example, the memory 130 may store the structure and parameter values of the image processing network 103 according to an embodiment of the disclosure, and the processor 120 may use the parameter values stored in the memory 130 to generate a second image in which the edge feature is preserved while the noise is removed from the first image according to an embodiment of the disclosure.

Moreover, the block diagram of the image processing apparatus 100 illustrated in FIG. 16 may be a block diagram for an embodiment of the disclosure. Each component of the block diagram may be integrated, added, or omitted according to the specifications of the image processing apparatus 100 that are actually implemented. That is, when necessary, two or more components may be combined into one component, or one component may be divided into two or more components. Also, functions performed by the respective blocks are for describing embodiments, and particular operations or devices thereof do not limit the scope of the disclosure.

The operating method of the image processing apparatus according to an embodiment of the disclosure may be stored in a computer-readable recording medium by being implemented in the form of program commands that may be performed by various computer means. The computer-readable recording medium may include program instructions, data files, and data structures either alone or in combination. The program commands recorded on the computer-readable recording medium may be those that are especially designed and configured for the disclosure, or may be those that are known and available to computer programmers of ordinary skill in the art. Examples of the computer-readable recording medium may include magnetic media such as hard disks, floppy disks, and magnetic tapes, optical media such as CD-ROMs and DVDs, and magneto-optical media such as floptical disks, and hardware devices such as ROMs, RAMs, and flash memories particularly configured to store and execute program commands. Examples of the program commands may include not only machine language code generated by a compiler but also high-level language code that may be executed by a computer by using an interpreter or the like.

Also, the image processing apparatus and the operating method thereof according to the described embodiments may be included and provided in a computer program product. The computer program product may be traded as a product between a seller and a buyer.

The computer program product may include a S/W program and a computer-readable storage medium with a S/W program stored therein. For example, the computer program product may include products in the form of S/W programs (e.g., downloadable apps) electronically distributed through manufacturers of electronic devices or electronic markets (e.g., Google Play Store and App Store). For electronic distribution, at least a portion of the S/W program may be stored in a storage medium or may be temporarily generated. In this case, the storage medium may be a storage medium of a server of a manufacturer, a server of an electronic market, or a relay server for temporarily storing the S/W program.

In a system including a server and a client device, the computer program product may include a storage medium of the server or a storage medium of the client device. Alternatively, when there is a third device (e.g., a smartphone) communicatively connected to the server or the client device, the computer program product may include a storage medium of the third device. Alternatively, the computer program product may include the S/W program itself that is transmitted from the server to the client device or the third device or transmitted from the third device to the client device.

In this case, one of the server, the client device, and the third device may execute the computer program product to perform the method according to the described embodiments. Alternatively, two or more of the server, the client device, and the third device may execute the computer program product to perform the method according to the described embodiments in a distributed manner.

For example, the server (e.g., a cloud server or an artificial intelligence server) may execute the computer program product stored in the server, to control the client device communicatively connected to the server to perform the method according to the described embodiments.

Although embodiments have been described above in detail, the scope of the disclosure is not limited thereto and various modifications and improvements made by those of ordinary skill in the art by using the basic concept of the disclosure defined in the following claims are also included in the scope of the disclosure.

What is claimed is:

1. An image processing apparatus comprising:
 a memory configured to store one or more instructions; and
 a processor configured to execute the one or more instructions stored in the memory to:
  obtain characteristic information of a first image,
  divide the characteristic information into a plurality of groups,
  input each group of the plurality of groups into a respective layer of a plurality of layers included in a convolutional neural network and perform a convolution operation using one or more kernels to obtain a plurality of pieces of output information corresponding to the plurality of groups from the plurality of layers,
  generate an attention map including weight information corresponding to each pixel of pixels included in the first image, based on the plurality of pieces of output information,
  generate a spatially variant kernel including a kernel corresponding to the each pixel, based on the attention map and a spatial kernel including weight information according to a position relationship between the each pixel and a neighboring pixel, and generate a second image by applying the spatially variant kernel to the first image.

2. The image processing apparatus of claim 1, wherein the characteristic information of the first image includes similarity information representing a similarity between the each pixel and the neighboring pixel.

3. The image processing apparatus of claim 2, wherein the processor is further configured to execute the one or more instructions to:

obtain first similarity information based on a difference between the each pixel and a first neighboring pixel having a first relative position with respect to the each pixel, and obtain second similarity information based on a difference between the each pixel and a second neighboring pixel having a second relative position with respect to the each pixel.

4. The image processing apparatus of claim 1, wherein the processor is further configured to execute the one or more instructions to divide the characteristic information according to channels to obtain the plurality of groups based on the characteristic information including a plurality of pieces of channel information.

5. The image processing apparatus of claim 4, wherein the processor is further configured to execute the one or more instructions to:

divide the plurality of pieces of channel information included in the characteristic information into a first group and a second group, input pieces of first channel information included in the first group into a first layer of the convolutional neural network, and input pieces of second channel information included in the second group into a second layer located after the first layer in the convolutional neural network.

6. The image processing apparatus of claim 5, wherein the processor is further configured to execute the one or more instructions to input the pieces of the second channel information and pieces of information output from the first layer into the second layer.

7. The image processing apparatus of claim 5, wherein the processor is further configured to execute the one or more instructions to:

obtain first output information corresponding to the first group from a third layer of the convolutional neural network, and obtain second output information corresponding to the second group from a fourth layer of the convolutional neural network, the fourth layer being located after the third layer in the convolutional neural network.

8. The image processing apparatus of claim 1, wherein the processor is further configured to execute the one or more instructions to downscale the characteristic information of the first image and divide the downscaled characteristic information into the plurality of groups.

9. The image processing apparatus of claim 1, wherein the processor is further configured to execute the one or more instructions to:

obtain quality information for the each pixel, obtain a plurality of output values corresponding to a plurality of pieces of preset quality information with respect to a group, obtain weights for the each pixel with respect to the plurality of output values based on the quality information for the each pixel, and apply the weights for the each pixel and sum the plurality of output values to obtain output information corresponding to the group.

10. The image processing apparatus of claim 1, wherein within the spatial kernel, a pixel located at a center of the spatial kernel has a greatest value, and pixel values decrease away from the center.

11. The image processing apparatus of claim 1, wherein a size of the spatial kernel is K×K and a number of channels of the attention map is $K^2$, and wherein the processor is further configured to execute the one or more instructions to:

arrange pixel values included in the spatial kernel in a channel direction to convert the spatial kernel into a weight vector having a size of $1 \times 1 \times K^2$, and generate the spatially variant kernel by performing a multiplication operation between the weight vector and each vector of a plurality of one-dimensional vectors having the size of $1 \times 1 \times K^2$ included in the attention map.

12. The image processing apparatus of claim 1, wherein a number of kernels included in the spatially variant kernel is same as a number of pixels included in the first image.

13. The image processing apparatus of claim 12, wherein the processor is further configured to execute the one or more instructions to generate the second image by:

performing filtering by applying a first kernel included in the spatially variant kernel to a first region centered on a first pixel included in the first image, and performing filtering by applying a second kernel included in the spatially variant kernel to a second region centered on a second pixel included in the first image.

14. An operating method of an image processing apparatus, the operating method comprising:

obtaining characteristic information of a first image;

dividing the characteristic information into a plurality of groups;

inputting each group of the plurality of groups into a respective layer of a plurality of layers included in a convolutional neural network and performing a convolution operation using one or more kernels to obtain a plurality of pieces of output information corresponding to the plurality of groups from the plurality of layers;

generating an attention map including weight information corresponding to each pixel of pixels included in the first image, based on the plurality of pieces of output information;

generating a spatially variant kernel including a kernel corresponding to the each pixel, based on the attention map and a spatial kernel including weight information according to a position relationship between the each pixel and a neighboring pixel; and generating a second image by applying the spatially variant kernel to the first image.

15. The operating method of claim 14, wherein the obtaining of the characteristic information of the first image comprises obtaining similarity information representing a similarity between the each pixel included in the first image and the neighboring pixel.

16. The operating method of claim 15, wherein the obtaining of the similarity information comprises:

obtaining first similarity information based on a difference between the each pixel included in the first image and a first neighboring pixel having a first relative position with respect to the each pixel; and obtaining second similarity information based on a difference between the each pixel included in the first image and a second neighboring pixel having a second relative position with respect to the each pixel.

17. The operating method of claim 14, wherein the dividing of the characteristic information into the plurality of groups comprises dividing the characteristic information according to channels to obtain the plurality of groups based on the characteristic information including a plurality of pieces of channel information.

18. The operating method of claim 17, wherein the dividing of the characteristic information into the plurality of groups further comprises dividing the plurality of pieces of channel information included in the characteristic information into a first group and a second group, and
wherein the obtaining of the plurality of pieces of output information comprises:
inputting pieces of first channel information included in the first group into a first layer of the convolutional neural network; and
inputting pieces of second channel information included in the second group into a second layer located after the first layer in the convolutional neural network.

19. The operating method of claim 18, wherein the obtaining of the plurality of pieces of output information further comprises inputting the pieces of the second channel information and pieces of information output from the first layer into the second layer.

20. A non-transitory computer-readable recording medium configured to store instructions which, when executed by at least one processor, cause the at least one processor to:
obtain characteristic information of a first image;
divide the characteristic information into a plurality of groups;
input each group of the plurality of groups into a respective layer of a plurality of layers included in a convolutional neural network and performing a convolution operation using one or more kernels to obtain a plurality of pieces of output information corresponding to the plurality of groups from the plurality of layers;
generate an attention map including weight information corresponding to each pixel of pixels included in the first image, based on the plurality of pieces of output information;
generate a spatially variant kernel including a kernel corresponding to the each pixel, based on the attention map and a spatial kernel including weight information according to a position relationship between the each pixel and a neighboring pixel; and
generate a second image by applying the spatially variant kernel to the first image.

* * * * *